US007283654B2

(12) United States Patent
McLain

(10) Patent No.: US 7,283,654 B2
(45) Date of Patent: Oct. 16, 2007

(54) DYNAMIC CONTRAST VISUALIZATION (DCV)

(75) Inventor: Peter B. McLain, Bellingham, WA (US)

(73) Assignee: LumenIQ, Inc., Bellingham, WA (US)

(*) Notice: Subject to any disclaimer, the term of this patent is extended or adjusted under 35 U.S.C. 154(b) by 0 days.

(21) Appl. No.: 11/212,485

(22) Filed: Aug. 26, 2005

(65) Prior Publication Data

US 2006/0072799 A1 Apr. 6, 2006

Related U.S. Application Data

(60) Provisional application No. 60/665,967, filed on Mar. 28, 2005, provisional application No. 60/630,824, filed on Nov. 23, 2004, provisional application No. 60/618,276, filed on Oct. 12, 2004, provisional application No. 60/605,223, filed on Aug. 26, 2004.

(51) Int. Cl.
G06K 9/00 (2006.01)
G06K 9/40 (2006.01)

(52) U.S. Cl. ..................................... 382/128
(58) Field of Classification Search ................ 382/128, 382/154, 130–133, 162, 164, 165, 254; 600/419, 600/420; 324/309; 378/56
See application file for complete search history.

(56) References Cited

U.S. PATENT DOCUMENTS

| RE35,656 | E  | * | 11/1997 | Feinberg et al. ............ 324/309 |
| 6,121,775 | A  | * | 9/2000  | Pearlman .................... 324/309 |
| 2003/0223627 | A1 | * | 12/2003 | Yoshida et al. ............. 382/128 |
| 2004/0030239 | A1 | * | 2/2004  | Van Zijl et al. ............ 600/420 |
| 2005/0010106 | A1 | * | 1/2005  | Lang et al. ................. 600/425 |
| 2006/0072799 | A1 | * | 4/2006  | McLain ...................... 382/128 |
| 2007/0047794 | A1 | * | 3/2007  | Lang et al. ................. 382/132 |

\* cited by examiner

*Primary Examiner*—Amir Alavi
(74) *Attorney, Agent, or Firm*—Graybeal Jackson Haley LLP

(57) ABSTRACT

Magnitude enhancement analysis of medical and dental images of tissue or organs such as MRI, PET, CT and x-ray images configured to display intensity-related features of high-bit images, such as grayscale without distorting the underlying intensity unless desired, and/or enhancing perception of saturation, hue, color channels and other space dimensions in a digital image, and external datasets related to a 2D image. In a preferred embodiment, the tissue or organ has been administered a contrast agent prior to the image being taken. In a more preferred embodiment, a series of images of the same tissue or organ has been taken over time to show changes in the tissue or organ over time.

44 Claims, 25 Drawing Sheets

DYNAMIC CONTRAST VISUALIZATION (DCV)

CROSS-REFERENCE TO RELATED APPLICATIONS

The present application claims priority from U.S. provisional patent application No. 60/605,223, filed on Aug. 26, 2004; U.S. Provisional patent application No. 60/618,276, filed Oct. 12, 2004; U.S. provisional patent application No. 60/630,824 filed Nov. 23, 2004; U.S. provisional patent application No. 60/665,967 filed Mar. 28, 2005; and, U.S. patent application Ser. No. 11/165,824, filed Jun. 23, 2005, which are incorporated herein by reference in their entirety and for all their teachings and disclosures.

BACKGROUND

The human eye and brain, or human visual system (HVS), helps people prosper in a competitive race for survival. Use of the HVS as a tool for analytical purposes such as medical or industrial radiography, is a fairly recent use of the HVS.

Visual observation of lightness or darkness ("grayscale") of items in an image or scene is a prominent method to identify items in the image, which items can be important, for example, to medical diagnosis and treatment, or industrial quality control, or other image-critical decision making processes. Other fields using observation of grayscale values include forensic, remote surveillance and geospatial, astronomy, geotechnical exploration, and others. These observation processes provide an important improvement to our overall health, safety, and welfare.

HVS perception of changes in grayscale tonal values (and other intensity values) is variable, affected by multiple factors. "Just noticeable difference—JND" identifies HVS ability to distinguish minor differences of grayscale intensity for side-by-side samples, and is also known as the Weber Ratio. A simple thought experiment exemplifies the variability of HVS perception, in this case, the variation of JND with overall luminance level. Consider sunrise; as dawn approaches, the pitch blackness reveals more detail of the surrounding scene to the HVS (discriminate more shades of gray) as the sun increases the scene illumination. This occurs even while adaptive discrimination of HVS (night vision) has adequate time to adjust our perception skills to the low illumination level at night. DICOM Part 14 to portray up to 1000 JND grayshades. The HVS may be able to perceive as many as 1,000 tonal grayshades under properly controlled observation conditions, but as a topographic surface, the perception task is relieved of this need for sophisticated methods.

LumenIQ, Inc. ("Lumen") has numerous patents and published patent applications that discuss methods, systems, etc., of using 3D visualization to improve a person's ability to see small differences in an image, such as small differences in the lightness or darkness (grayscale data) of a particular spot in a digital image. U.S. Pat. No. 6,445,820; U.S. Pat. No. 6,654,490; U.S. 20020114508; WO 02/17232; 20020176619; 20040096098; 20040109608. Generally, these methods and systems display grayscale (or other desired intensity, etc.) data of a 2D digital image as a 3D topographic map: The relative darkness and lightness of the spots (pixels) in the image are determined, then the darker areas are shown as "mountains," while lighter areas are shown as "valleys" (or vice-versa). In other words, at each pixel point in an image, grayscale values are measured, projected as a surface height (or z axis), and connected through image processing techniques. FIGS. 1A and 1B show examples of this, where the relative darkness of the ink of two handwriting samples are shown in 3d with the darker areas shown as higher "mountains."

This helps the HVS to overcome its inherent weakness at discerning subtle differences in image intensity patterns in a 2D image. If desired, the image can then be identified, rotated, flipped, tilted, etc. Such images can be referred to as magnitude enhancement analysis images, although the kinematic (motion) aspect need only be present when desired (in which case the created representations are not truly kinematic images). These techniques can be used with any desired image, such as handwriting samples, fingerprints, DNA patterns ("smears"), medical images such as MRIs, x-rays, industrial images, satellite images, etc.

There has gone unmet a need for improved systems and methods, etc., for interpreting and/or automating the analysis of images such as medical images. The present systems and methods provide these or other advantages.

SUMMARY

In one aspect, a contrast agent is administered to an individual such that it is absorbed by or otherwise associated with a tissue or an organ of interest and an at least 2-dimensional digital image such as a processed image maximum intensity projection (MIP) of the tissue and agent is obtained to provide a medical image. The medical image is subjected to magnitude enhancement analysis such that at least one relative magnitude across at least a substantial portion of the image is depicted in an additional dimension relative to the at least 2-dimensions to provide a magnitude enhanced image such that additional levels of magnitudes are substantially more cognizable to a human eye compared to the 2-dimensional image without the magnitude enhancement analysis. Examples of medical images are magnetic resonance images (MRI), computational tomography (CT) scan images, a positron emission tomography (PET) scan image, radiographs, including dental images and ultrasound images. The magnitude enhancement analysis provides a valuable approach to following and watching the uptake, metabolization, half-life, etc., of the contrast agent in the tissue(s) or organs(s) under review.

In some embodiments, methods are provided for determining and visualizing a change in biology, chemistry or physical properties of the tissue or organ in which a first at least 2-dimensional digital image of tissue or organ of an individual at an initial time period is provided and additional digital images of the tissue or organ at later periods of time are also provided. All desired images are subjected to magnitude enhancement analysis, then the magnitude enhanced images are compared with each other to indicate changes in the tissue or organ of the individual over time. The z-values and grayscale values can be interpolated between two points in time. If desired, the analysis can include time-lapse or real-time visualization of the change in the property, and can, for example, be performed over a matter of seconds or minutes (for example when determining the effects of a rapidly used metabolite or contrast agent) to days, months or years (for example when determining the growth or recession of a tumor of bone condition).

In some embodiments, the methods, systems, etc., discussed herein can be implemented to bypass the limitations of both display restrictions and HVS perception, portraying high bit level (9 or more bits) grayscale data (or other intensity date) as a 3-dimensional object using 8 bit display devices, and helping unaided HVS perception skills. With 3D surface or object display, human perception and image display grayscale limitations can be reduced, allowing display of an unlimited number of grayscale (and other) intensities.

Turning to further embodiments, digital images have an associated color space that defines how the encoded values for each pixel are to be visually interpreted. Common color spaces are RGB, which stands for the standard red, green and blue channels for some color images and HSI, which stands for hue, saturation, intensity for other color images. The values of pixels measured along a single dimension or selected dimensions of the image color space to generate a surface map that correlates pixel value to surface height can be applied to color space dimensions beyond image intensity. For example, the methods and systems herein, including software, can measure the red dimension (or channel) in an RGB color space, on a pixel-by-pixel basis, and generate a surface map that projects the relative values of the pixels. In another example, the present innovation can measure image hue at each pixel point, and project the values as a surface height.

Further, the height of a gridpoint on the z axis can be calculated using any function of the 2D data set representing the image or related in some meaningful way to the image. A function to change information from the 2D data set to a z height may take the form f(x, y, pixel value)=z. All of the color space dimensions can be of this form, but there can be other values as well. For example, a function can be created in software that maps z height based on (i) a lookup table to a Hounsfield unit (f(pixelValue)=Hounsfield value), (ii) just on the 2D coordinates (e.g., f(x,y)=2x+y), (iii) any other field variable that may be stored external to the image, (iv) area operators in a 2D image, such as Gaussian blur values, or Sobel edge detector values, or (v) multi-modality data sets where one image is from an imaging modality (such as MR or CT) and a matched or registered image from another imaging modality (such as PET or Nuclear Medicine). In certain embodiments, the gray scale at each grid point is derived from the first image, and the height is derived from the second image.

As an example, the software, etc., can contain a function g that maps a pixel in the 2D image to some other external variable (for example, Hounsfield units) and that value can then be used as the value for the z height (with optional adjustment). The end result is a 3D topographic map of the Hounsfield units contained in the 2D image; the 3D map would be projected on the 2D image itself.

In other embodiments, the present discussion includes methods of displaying a high bit level image on a low bit level display system. The methods can comprise: a) providing an at least 2-dimensional high bit level digital image; b) subjecting the high bit level image to magnitude enhancement analysis such that at least one relative magnitude across at least a substantial portion of the print can be depicted in an additional dimension relative to the at least 2-dimensions to provide a magnitude enhanced image such that additional levels of magnitudes can be substantially more cognizable to a human eye compared to the 2-dimensional image without the magnitude enhancement analysis; c) displaying a selected portion of the enhanced image on a display can comprise a low bit level display system having a bit level display capability less than the bit level of the high bit level image; and, d) providing a moveable window configured to display the selected portion such that the window can move the selected portion among an overall range of the bit level information in the high bit level image.

In some embodiments, the selected portion can comprise at least one bit level less information than the bit level of the high bit level image, and the high bit level image can be at least a 9 bit level image and the display system can be no more than an 8 bit level display system. The high bit level image can be a 16 bit level image and the display system can be no more than an 8 bit level display system. The image can be a can be a digital conversion of a photographic image, and the magnitude can be grayscale, and/or comprise at least one of hue, lightness, or saturation or a combination thereof. The magnitude can comprise an average intensity defined by an area operator centered on a pixel within the image, and can be determined using a linear or non-linear function.

The magnitude enhancement analysis can be a dynamic magnitude enhancement analysis, which can comprise at least one of rolling, tilting or panning the image, and can comprise incorporating the dynamic analysis into a cine loop.

In another embodiment, the discussion herein includes methods of determining and visualizing a thickness of a sample. This can comprise: a) providing an at least 2-dimensional transmissive digital image of the sample; b) subjecting the image to magnitude enhancement analysis such that at least one relative magnitude across at least a substantial portion of the print can be depicted in an additional dimension relative to the at least 2-dimensions to provide a magnitude enhanced image such that additional levels of magnitudes can be substantially more cognizable to a human eye compared to the 2-dimensional image without the magnitude enhancement analysis; and c) comparing the magnitude enhanced image to a standard configured to indicate thickness of the sample, and therefrom determining the thickness of the sample.

In some embodiments, the methods further can comprise obtaining the at least 2-dimensional transmissive digital image of the sample. The standard can be a thickness reference block, and the sample can be substantially homogenous. The thickness reference block and the sample can be of identical material, the thickness reference block can have thickness values to provide intermediate thickness values with respect to the object of interest, and can be located substantially adjacent to each other.

In another aspect, the discussion herein includes methods of displaying a color space dimension, comprising: a) providing an at least 2-dimensional digital image comprising a plurality of color space dimensions; b) subjecting the 2-dimensional digital image to magnitude enhancement analysis such that a relative magnitude for at least one color space dimension but less than all color space dimensions of the image is depicted in an additional dimension relative to the at least 2-dimensions to provide a magnitude enhanced image such that additional levels of magnitudes of the color space dimension are substantially more cognizable to a human eye compared to the 2-dimensional image without the magnitude enhancement analysis; c) displaying at least a selected portion of the magnitude enhanced image on a display; and, d) analyzing the magnitude enhanced image to determine at least one feature of the color space dimension that would not have been cognizable to a human eye without the magnitude enhancement analysis.

In some embodiments, the methods further comprise determining an optical density of at least one object in the image, such as breast tissue. The magnitude enhancement analysis is a dynamic magnitude enhancement analysis, and can comprise, if desired, dynamic analysis comprising at least rolling, tilting and panning the image.

In another aspect, the discussion herein includes computer-implemented programming that performs the automated elements of any of the methods herein, as well as computers comprising such computer-implemented programming. The computer can comprise a distributed network of linked computers, can comprise a handheld and/or wireless computer. The systems can also comprise a networked computer system comprising computer-implemented programming as above. The networked computer system can comprise a handheld wireless computer, and the methods can be implemented on the handheld wireless computer. The systems can also comprise a networked computer system comprising a computer as discussed herein.

These and other aspects, features and embodiments are set forth within this application, including the following Detailed Description and attached drawings. In addition, various references are set forth herein, including in the Cross-Reference To Related Applications, that discuss certain systems, apparatus, methods and other information; all such references are incorporated herein by reference in their entirety and for all their teachings and disclosures, regardless of where the references may appear in this application.

BRIEF DESCRIPTION OF THE DRAWINGS

FIG. 17 shows an example using a blue translucent visualization plane. This view shows that the physician or other viewer is offered a view that simultaneously shows the contrast uptake "curves" for all pixels at a single time slice. This allows the physician to view the "morphology of the tumor" at each point in time during the DCV visualization.

DETAILED DESCRIPTION

Figure 1A:
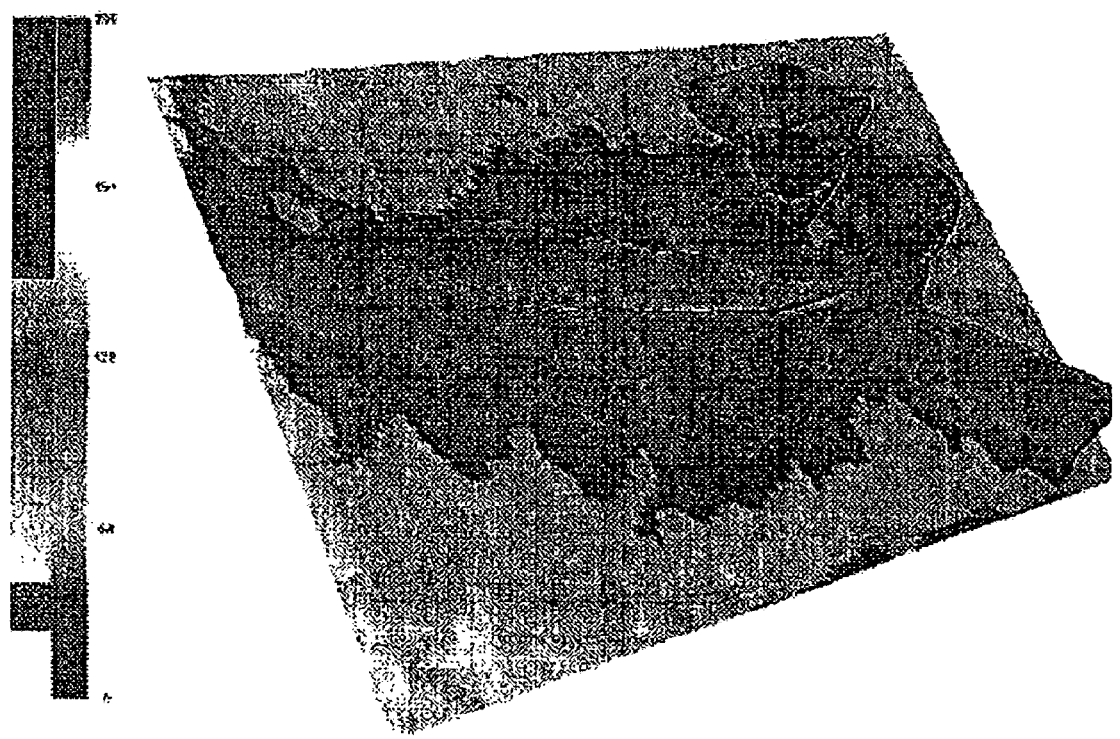
FIGS. 1A and 1B show examples of magnitude enhancement analysis processing of two handwriting samples with the darker areas shown as higher "mountains."

In one aspect, the present discussion is directed to the processing and visualization of medical images, including dental images, to enhance the ability to follow changes in time of a contrast agent, an untreated body structure such as a tissue or organ, where the changes are more easily seen using enhanced ability to see even slight changes in the grayness of the target, or even slight changes in other aspects of images of the target such as changes in hue, saturation, etc. The medical image is subjected to magnitude enhancement analysis such that at least one relative magnitude across at least a substantial portion of the image is depicted in an additional dimension relative to the at least 2-dimensions to provide a magnitude enhanced image such that additional levels of magnitudes are substantially more cognizable to a human eye compared to the 2-dimensional image without the magnitude enhancement analysis. Examples of medical images are magnetic resonance images (MRI), computational tomography (CT) scan images, a positron emission tomography (PET) scan image, radiographs, including dental images and ultrasound images. The magnitude enhancement analysis provides a valuable approach to following and watching the uptake, metabolization, half-life, etc., of the contrast agent in the tissue(s) or organs(s) under review.

The present systems and methods also provides approaches comprising magnitude enhancement analysis configured to display intensity-related features of high-bit images, such as grayscale, on low-bit display systems, without distorting the underlying intensity unless desired, measuring the thickness of materials, and/or enhancing perception of saturation, hue, color channels and other color space dimensions in a digital image, and external datasets related to a 2D image. These various aspects and embodiments provide improve systems and approaches to display and analyze, particularly through the human eye (HVS).

Turning to a general discussion of human observational characteristics generally related to high bit display on low bit display terminals, the capture and processing of grayscale in an image can be considered as 2 portions: First, the display portion includes the image acquisition, film/data processing and the display of grayscale image intensities. The display may be a variety of methods including CRT monitor, transparency film on a light box, printed hardcopy photographs, and more. The display process is designed to portray an image judged by the observer to correctly represent the source scene. Second, the observation portion includes human observer perception of the grayscale image intensity display, subject to a wide variety of individualized perception limitations (e.g., age) and environmental surrounding factors (e.g., ambient lighting level). While HVS is highly adaptable to changes in luminous intensity, HVS is relatively poor at quantitatively identifying similar intensities separated by distances or by a few seconds of time. HVS has poor ability to determine exact intensity values.

The conflict between limited grayscale display capabilities and the need for accurate reproduction of wide ranging grayscale scene image information can be treated with the innovative approaches herein. The 3D surface construction relieves the image display equipment from the requirement of accurate grayscale tonal intensity reproduction, or the use of image processing to compress high dynamic range (HDR) intensities for display on low dynamic range (LDR) devices. See, e.g., Digital Imaging and Communications in Medicine (DICOM) Part 14: Grayscale Standard Display Function, http://medical.nema.org/; CRT/LCD monitor calibration procedure, http://www.brighamandwomens.org/radiology/Research/vispercep.asp; Display of high dynamic range data on a low dynamic range display devices, J. DiCarlo and B. Wandell, Rendering High Dynamic Range Images, In Proceedings of the SPIE Electronic Imaging "2000 conference, Vol. 3965, p.p. 392-401, San Jose, Calif., Jan. 2000).

Portraying grayscale intensity as Z-axis elevations produces a 3D surface, independent of the need for accurate grayscale tonality, hence dynamic range presentation. Scene dynamic range can be portrayed and perceived in 3-d as shapes and dimensions, with spatial units of measure providing accurate reporting of image grayscale values.

The number of z-values (e.g., grayscale values) mapped on the 3D surface matches the, e.g., grayscale data contained in the electronic image file (for example, 16 bit data allows 65,536 grayscales) yet can be accurately represented on a display having lesser, e.g., 8-bit, display capabilities and/or less than 65,536 available grayscale shades on the screen (or other display device) to show each of the shades. The methods and software, etc., herein address the challenging task of accurate display and perception of, e.g., JNDs or widely varying extremes of dynamic range in grayscale values. Examples of extreme ranges include sunlight, bright lamp intensities, cave-like darkness, which can be mapped to the 3D surface representations herein and presented for observation. The quality of image acquisition can be the limiting factor controlling the number of potential grayshades available for display and perception. The systems, etc., herein comprise providing and using an interactive surface elevation (3d) representation that allows extremely small, as well as very large, changes in grayscale values to be mapped with high accuracy and detail definition.

The systems, etc., transform grayscale image intensity/film density to a 3D surface representation of the grayscale image intensity/film density, where grayscale tonal values are transformed into "elevation" shapes and forms corresponding to the grayscale value of the respective pixel. The elevation shapes and forms can be represented at any chosen contrast levels or hues, avoiding grayscale tonal display and HVS perception issues. The systems, etc., provide methods of displaying grayscale shades of more than 8 bits (more than 256 shades) and higher (16 bit, 65,536 grayscale shades for example) on conventional display equipment, typically capable of a maximum of 8 bit grayscale discrimination. This is done by mapping the digitized grayscale image spatial information on the X and Y axes of the image while plotting the grayscale value on a Z-axis or elevation dimension.

The resulting three dimensional surface can assign any desired length and scale factor to the Z-axis, thus providing display of grayscale information equal to or exceeding the common 256 grayscale limitation of printers, displays, and human visual perception systems. By these approaches, a full range of grayscale extremes and subtle changes can be perceived at one or more moments by the human visual perception system.

In this and other embodiments (unless expressly stated otherwise or clear from the context, all embodiments, aspects, features, etc., can be mixed and matched, combined and permuted in any desired manner), a variety of interactive tools and aids to quantitative perception can be used, such as zoom, tilt, pan, rotation, applied color values, isopleths, linear scales, spatial calibration, mouse gesture measurement of image features, surface/wireframe/contour/grid point mapping, contour interval controls, elevation proportions and scaling, pseudocolor/grayscale mapping, color/transparency mapping, surface orientation, surface projection perspectives, close-up and distant views, comparison window tiling and synchronization, image registration, image cloning, color map contrast control by histogram equalize and linear range mapping. Additional tools can be also be used.

The Z-axis of a high bit level surface image can be assigned a scale factor consistent with the bit level of the image, such as 1024 for 10 bit image, 4096 for 12 bit image and so-on. In this way, the monitor or printer no longer needs to provide the 1024 or 4096 gray shades reproduction and discrimination ability, since the Z-axis dimension represents the gray shade as a unit of distance along the Z-axis. The image can be viewed using interactive tools discussed elsewhere herein, for example, zooming and rotating for improved viewing perspectives.

Often, data is not compressed due to a desire to view the unaltered high dynamic range data. An alternative processing scheme, such as "windows" and "leveling" is provided. In this case, the grayscale values exceeding the monitor's or printer's capability requires the analyst to adjust the output of the display using image processing tools. Typically, a new portion of the overall grayscale will become visible at the expense of losing visibility of another portion of the grayscale.

The adjustment process uses the term "window" to discuss a subset of the overall grayscale range, 256 of 4096 for example. This "window" may be located to view grayscale values at midtone "level" (1920 to 2176), extremely dark "level" (0 to 255), or elsewhere along the 4096, 12 bit scale. For an extremely dark example, a 256 grayscale portion (window) of extremely dark (level) grayscales from the 4096 or other high bit level image, would be adjusted to display those dark grayscales using midtone level grayscales readily visible to the HVS on common display equipment, otherwise the balance of 3840+grayscales (4096 minus 256) in the 12 bit image would generally not be visible on the display to the human eye, and possibly not distinguished by the display itself. By use of a 3 dimensional surface, the extremely dark shades are mapped to differences in height on the surface and the height differences are visible without adjustment (window and level), as well as the midtone and extremely light shades of gray. All 4096 grayscale values will be available for HVS perception (or more, if desired) as 3D surface object.

Printing devices have limited grayscale reproduction capability as well. Printing devices benefit from these innovations in the same manner as electronic display devices.

Mapping the grayscale value to elevation has the additional benefit of disrupting some grayscale illusions. (See Grayscale visual perception illusions by Perceptual Science Group at MIT; http://web.mit.edu/persci/.) Grayscale illusions are the result of human visual perception systems performing adjustments to an image to match our a priori knowledge of the image (e.g., checkerboard illusion), enhancing edges for improved detection (e.g., mach bands), and other low and high order vision processes.

Figure 2:
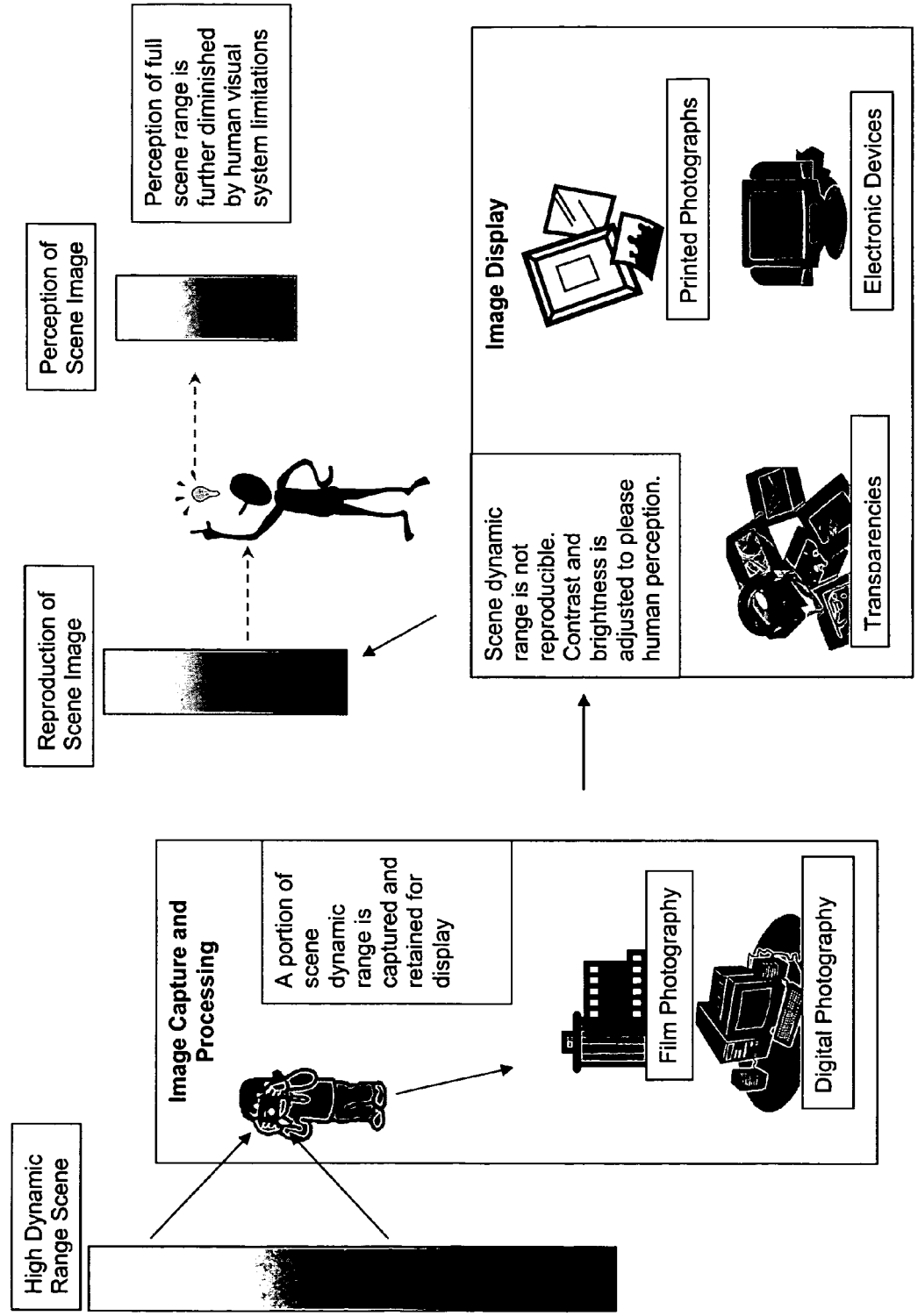
FIG. 2 schematically depicts image perception as a system of scene, capture, processing, display, and observation processes.

The following provides an example, including supporting discussion, of high bit display on low bit display systems. Presentation of a scene image for human perception involves a process of transformations that can be as illustrated in FIG. 2. The following five steps are useful to discuss the process:

1. Scene—The range of luminous intensities which exist in a scene can be extremely large, exceeding the intensity variations perceived by human visual adaptation. HVS adaptation given sufficient time can exceed 100 million to 1 ratio ($10^9$, starlight to bright daylight). The range of scene intensities can also be very low, such as a monotone painted wall, with very subtle intensity variations.

2. Capture Device—Typical photographic intensity ratio capture is less than 10,000 to 1 ($10^4$) maximum. Capture limitations are technical/hardware related, such that high quality, medical/scientific/military devices capture a greater dynamic range and store the information as high bit level data. High bit level data is common with high quality devices, while consumer/office quality digital capture devices default to 8 bit grayscale resolution. This requires compression or other alteration of the high bit level data, reducing grayscale resolution to 256 grayscale tones. Film photography typically captures higher dynamic range and higher grayscale resolution than consumer/office quality devices, although digital methods are advancing quickly.
3. Image Processing—Special purpose, scientific/military image processing methods can retain the full captured dynamic range as well as using high bit level data to provide high resolution of grayscale values. Film methods typically capture higher dynamic range and higher grayscale resolution than consumer/office digital methods. But, digital methods are improving rapidly and are trending to displace film methods. Consumer/office quality digital image processing defaults to 8 bit methods, with resultant loss of grayscale value resolution.
4. Image Display—Reproduction of the image by CRT monitor or printed paper photograph produces a luminance dynamic range of approximately 100:1 (ref 9, 10). While human perception can adapt within a few seconds to perceive luminance values over a wider range, such wider range luminance information cannot be accurately reproduced by consumer/office quality display devices. Technology advances including LCD/LED/plasma displays provide some dynamic range improvements, and the improvement trend is expected to continue.
5. Observer—human vision can operate over a wide range of dynamic range intensities ($10^9$) given sufficient adaptation time. A narrower range ($10^4$) is comfortably adapted over a short time, and an even narrower range is perceived without adaptation, approx 100:1. This narrow range is very similar to the image display hardware maximum range. The close match of display quality and HVS instantaneous grayscale perception can be a result of R&D defining HVS skills.

Figure 3:
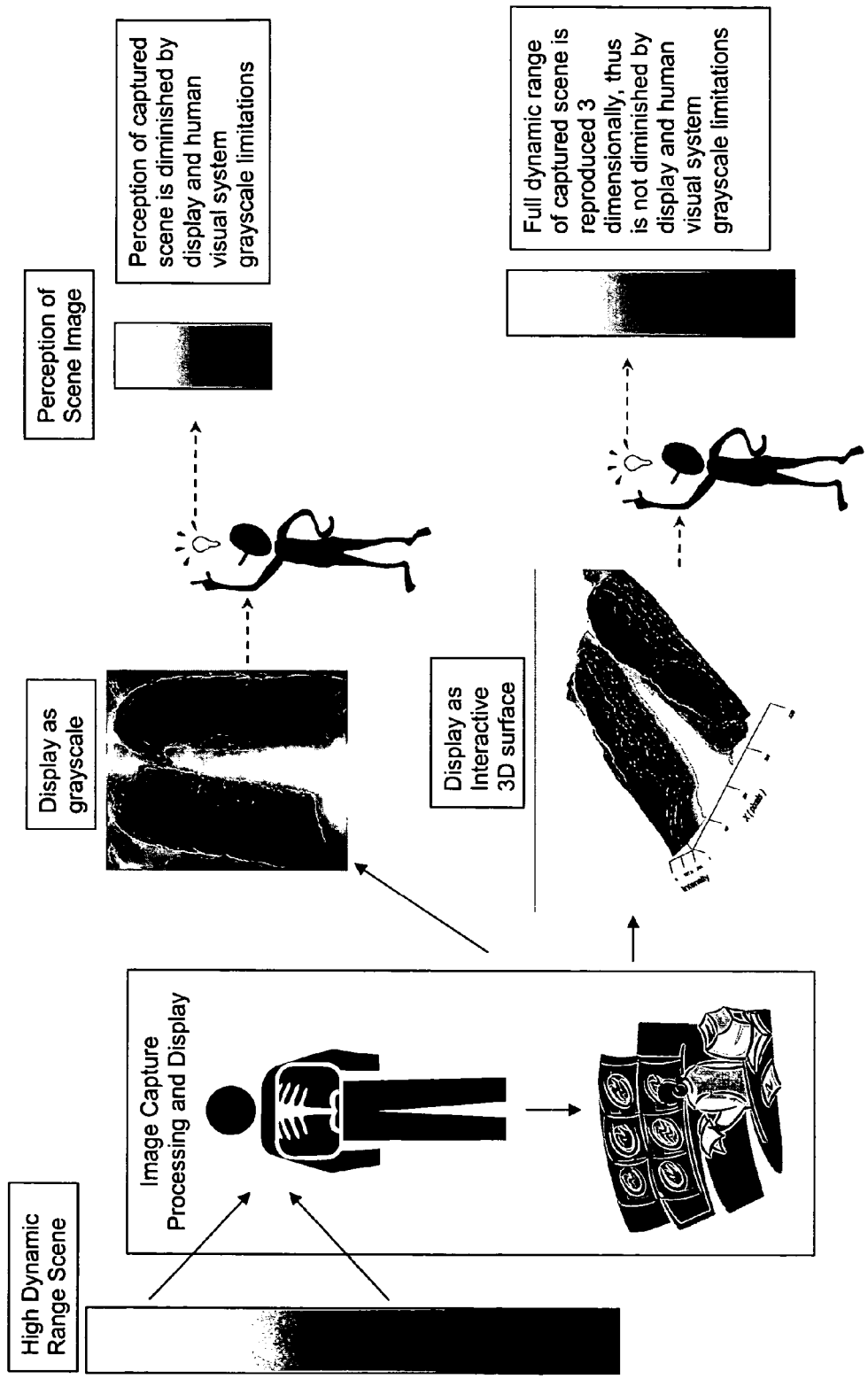
FIG. 3 schematically depicts an application of image perception processes for diagnostic and analytical decision making purposes improved by use of 3D surface mapping of image intensity data.

The processes, etc., herein can be employed, for example, at the image processing steps, image display and HVS observation steps 3, 4, and 5 in FIG. 2. The processes, etc., transform the image from a grayscale tonal or luminance reproduction to a 3D surface as shown by the lower "path" in FIG. 3. The 3D surface representation as compared to conventional 2D methods is illustrated in FIG. 3 for the example of a chest X-ray image. The full dynamic range obtained at the image capture stage can be retained and displayed to the observer free of the image processing, display and perception constraints of the conventional grayscale intensity representation method (upper "path" of FIG. 3). Application of the 3D surface method can utilize image data as it exists prior to conventional image processing methods of brightness and contrast adjustment or dynamic range compression.

As noted above, the processes transform the 2D grayscale tonal image to 3D by "elevating" (or depressing, or otherwise "moving") each desired pixel of the image to a level proportional to the grayscale tonal value of that pixel in its' 2D form. The values on the z-axis can be scaled by an arbitrary scale-factor to control the height of the mountain. The pixel elevations can be correlated 1:1 corresponding to the grayscale variation, or the elevations can be modified to correlate 10:1, 5:1, 2:1, 1:2, 1:5, 1:10, 1:20 or otherwise as desired. (As noted elsewhere herein, the methods can also be applied to image features other than grayscale, such as hue and saturation; the methods, etc., herein are discussed regarding grayscale for convenience.) The ratios can also be varying such that given levels of darkness or lightness have one ratio while others have other ratios, or can otherwise be varied as desired to enhance the interpretation of the images in question. Where the ratio is known, measurement of grayscale intensity values on a spatial scale (linear, logarithmic, etc.) becomes readily practical using conventional spatial measurement methods, such as distance scales or rulers.

The pixel elevations are typically connected by a surface composed of an array of small triangular shapes (or other desired geometrical or other shapes) interconnecting the pixel elevation values. The edges of each triangle abut the edges of adjacent triangles, the whole of which takes on the appearance of a surface with elevation variations. In this manner the grayscale intensity of the original image resembles a topographic map of terrain, where higher (mountainous) elevations could represent high image intensity, or density values. Similarly, the lower elevations (canyon-lands) could represent the low image intensity or density values. The use of a Z-axis dimension allows that Z-axis dimension to be scaled to the number of grayscale shades inherently present in the image data. This method allows a much larger number of scale divisions to be applied to the Z-axis of the 3D surface, exceeding the typical 256 divisions (gray shades) present in most conventional images. High bit-depth image intensity values can be mapped onto the 3D surface using scales with 8 bit (256 shades), 9 bit (512 shades), 10 bit (1,024 shades) and higher (e.g., 16 bit, 65,536 shades).

Figure 1B:
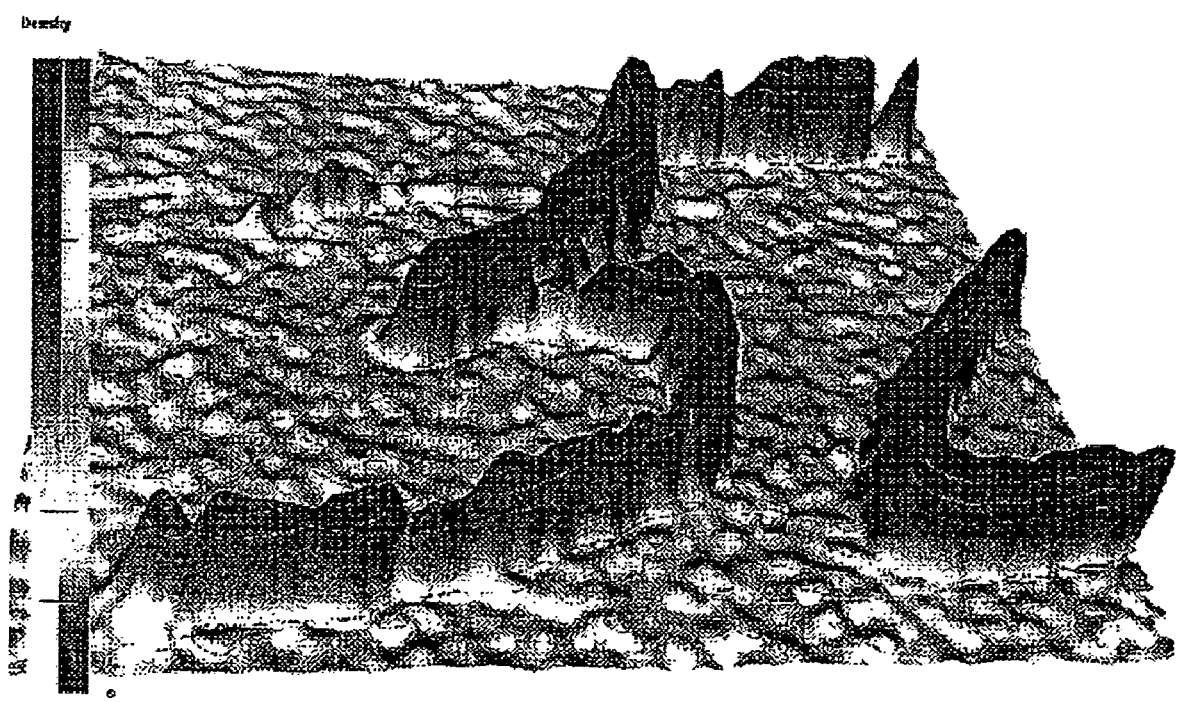

As a surface map, the image representation can utilize aids to discrimination of elevation values, such as isopleths (topographic contour lines, FIG. 1B), pseudo-colors assigned to elevation values, increasing/decreasing elevation proportionality to horizontal dimensions (stretching), fill and drain effects (visible/invisible) to explore topographic forms, and more.

Figure 4:
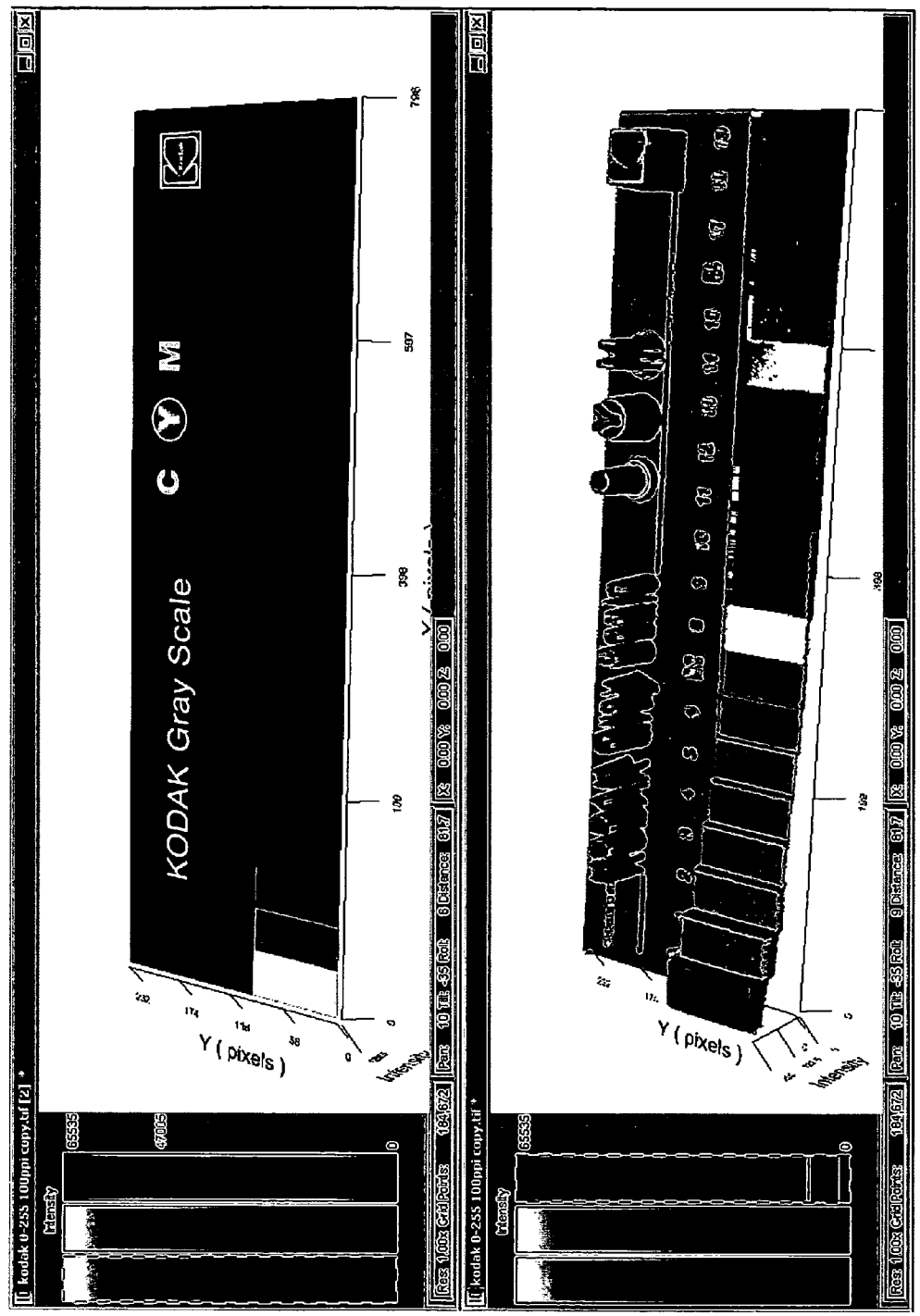
FIG. 4 schematically depicts interactive transformation of grayscale intensity to elevation using a Kodak grayscale. The 3D surface image in the lower panel uses pseudocolor and perspective view in addition to mapping grayscale intensity to the z-axis. High bit level grayscale tonal information can thus be represented independent of human grayscale and display limitations.

FIG. 4 illustrates a 3D surface method of mapping image intensity using a standard reference object. The exemplary object is the Kodak grayscale Q-13, Catalog number 152 7654, a paper-based grayscale target for quality control of photographic images. The dynamic range of grayscale is from 0.05 density to 1.95 in 20 density steps of 0.10 density increments. This scale closely matches photographic grayscale reproduction range capability. The observer will note the darkest grayscale targets will appear to be very similar to one another. The dark shades appear very similar, despite the fact that density increments vary by the constant value of 0.10 units between them. Using the systems herein, the elevation dimension can be used to discriminate between these very similar shades, as well as use of pseudo-color mapping as shown in FIG. 4.

The Kodak target is a low dynamic range object, representative of grayscale range reproducible with photographic methods. High dynamic range images with many times darker and brighter regions can also be accurately reproduced using the systems, etc., herein. As an elevation map, these dark and bright shades can be readily observable as shapes corresponding to that grayscale value.

Figure 5:
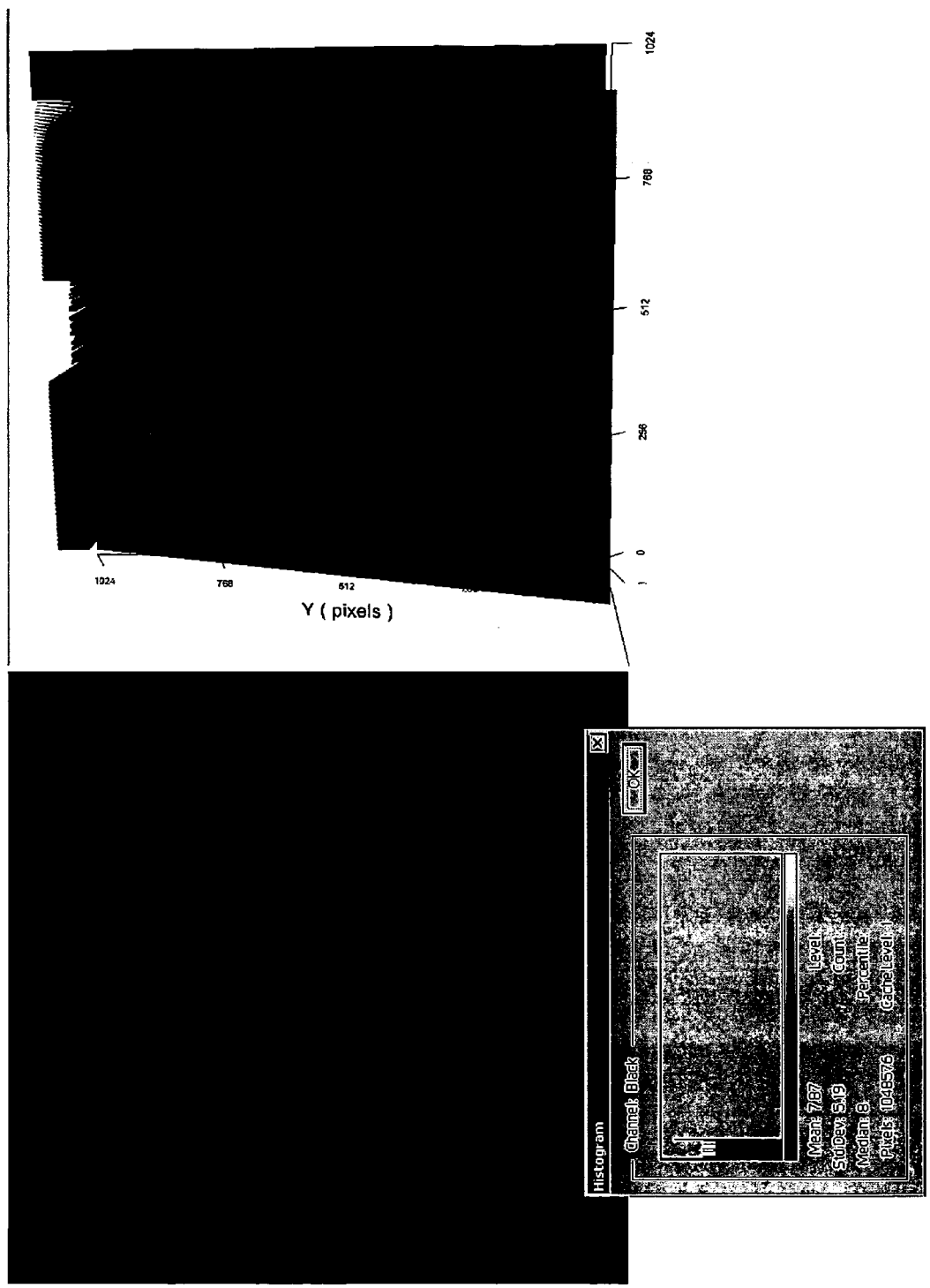
FIG. 5 schematically depicts a TG18-PQC test pattern for comparison of printed film and electronic display luminance conventional (left) and intensity surface display (right), no contrast adjustment.

High bit level images shown as a 3D surface can accurately portray grayscale intensity information that greatly exceeds display device ability to accurately reproduce HDR grayscale intensity tonal values. Transformation of extreme (and subtle) gray shades to a 3 dimensional surface as discussed herein provides spatial objects for detection by HVS, and for display devices. FIG. 5 is a side-by-side comparison of a test pattern image available from the American Association of Physicists in Medicine, Task Group 18 (AAPM TG18: American Association of Physicists in Medicine Task Group 18 http://deckard.mc.duke.edu/~samei/tg18). The 16 bit image (TG18-PQC Test Pattern for Comparison of Printed Film and Electronic Display Luminance) is shown on the left side as it would normally appear on a conventional electronic display. On the right hand side is the image as it appears using the methods herein, a 3D surface elevation object rotated to show the resulting surface shape.

The image data in the very low intensity range 0-4,096 of 65,536 of full range grayscale, typical of radiography procedures. The contrast sensitivity of radiographic films is optimized in this low intensity range. The 3D surface is much more visible as compared to the adjacent normal 2D tonal intensity view, plus interactive software tools can be used for further evaluation.

Figure 6:
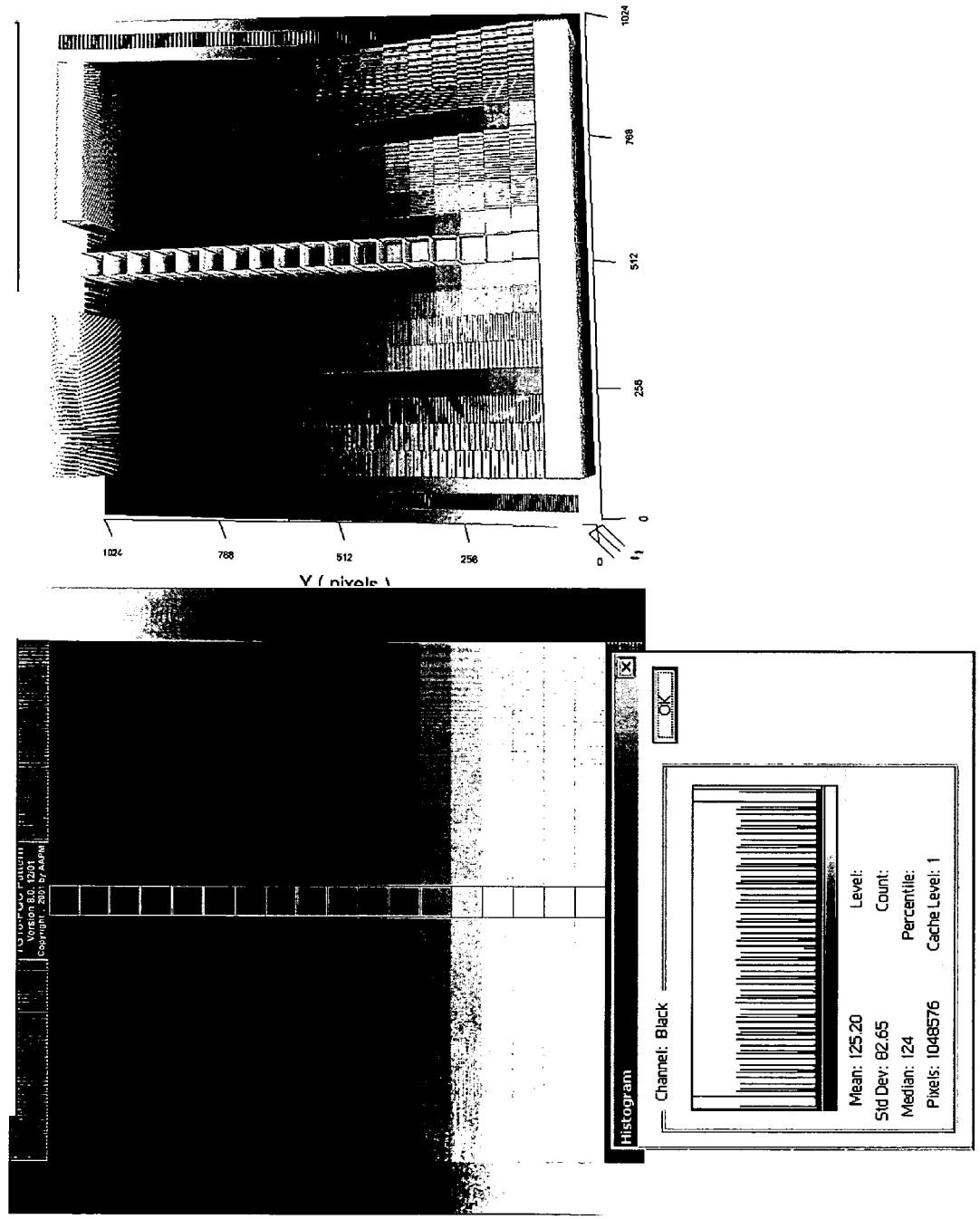
FIG. 6 schematically depicts a TG18-PQC test pattern for comparison of printed film and electronic display luminance conventional (left) and Surface Intensity Map display (right), with contrast adjustment.

FIG. 6 illustrates a common treatment of image data for 2D viewing, adjusting the brightness or level of the data to bring the grayscale values into a region where display devices can reproduce, and HVS can perceive, the (altered) tonal values. Comparing the histogram of FIG. 6 to histogram of FIG. 5 identifies the alterations to the image data.

Figure 7:
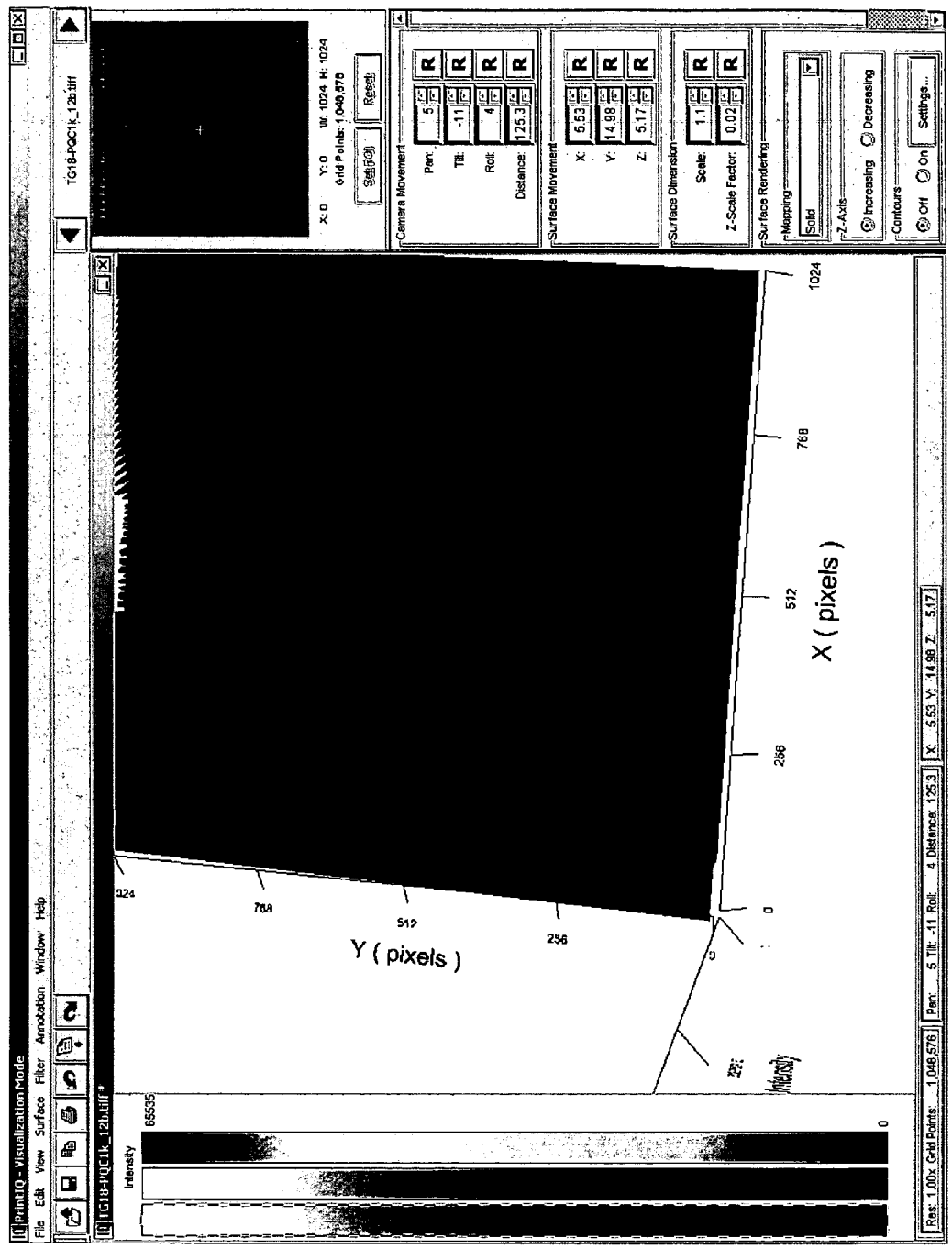
FIG. 7 schematically depicts a TG18-pqc test pattern for comparison of printed film and electronic display luminance magnitude enhancement analysis view of 3D surface, 65,536 grayscale Z-axis. 3D surface image is composed of grayscale intensities 0 to 4096. Full range display identifies the grayscale intensity region of interest.
Figure 8:
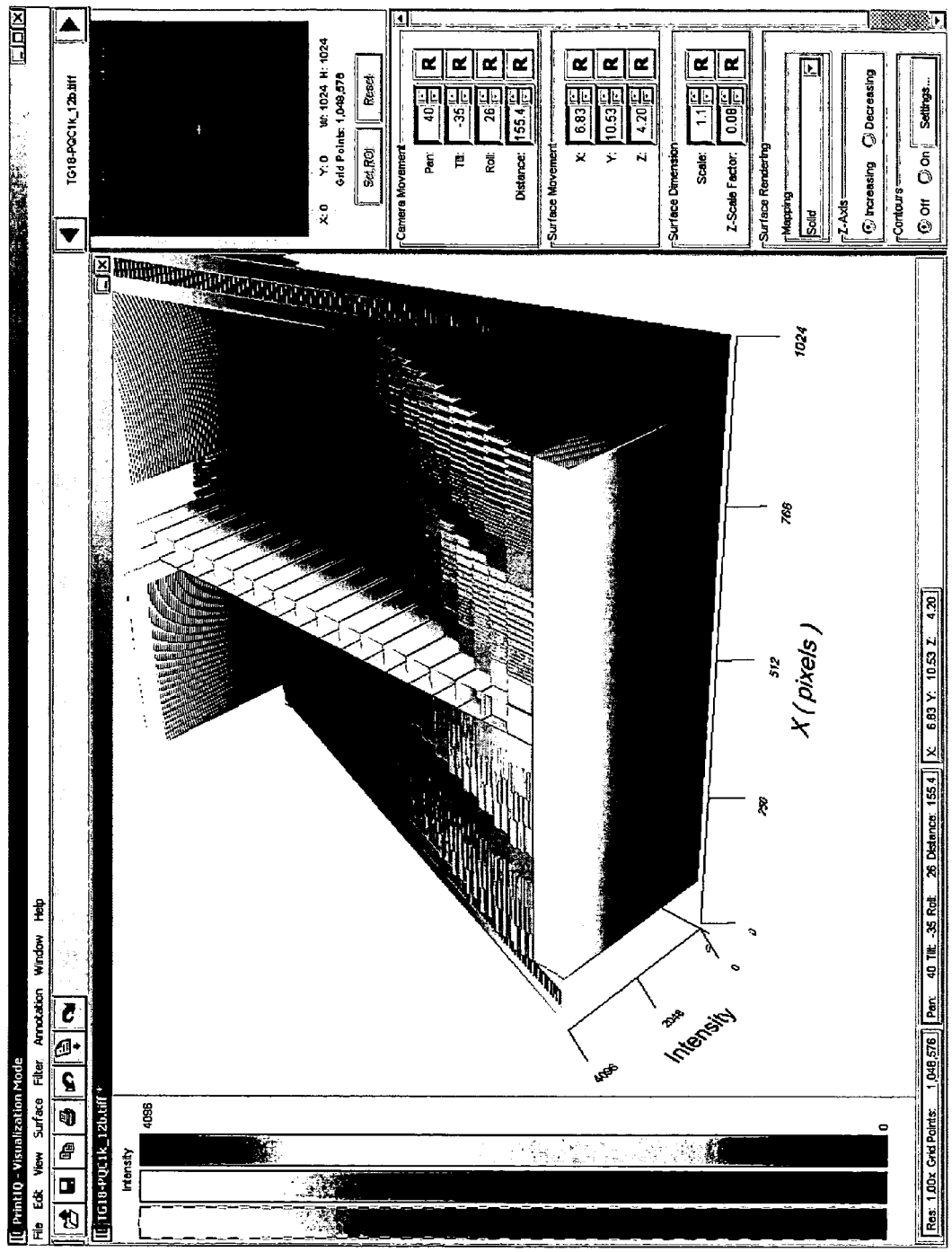
FIG. 8 schematically depicts a TG18-PQC test pattern for comparison of printed film and electronic display luminance magnitude enhancement analysis view of 3D surface showing 65,536 grayscale Z-axis clipped to display grayscales 0 to 4096. Clipping of the Z-axis need not alter any of the grayscale data values or their contrast relationships.

FIG. 7 illustrates the same image as FIG. 5, with no contrast adjustments, full grayscale range of 0 to 65,536. The Z-axis projects out of the field of view in this case, since the image is a test pattern for radiographic displays. The software interface is shown to illustrate certain tools available for further image data evaluation actions. FIG. 8 is the same image data with the Z-axis "clipped" via a viewing window to the grayscale region of interest (0 to 4096), boosting 3D surface visibility without alteration to the image dataset.

Turning to a general discussion of methods, apparatus, etc., for determining the thickness of a material using magnitude enhancement analysis, the systems and software herein can indicate corrosion, defects or other artifacts in an imaged, e.g., x-rayed, object. Review of industrial images shows that the software, by accurately measuring and projecting/displaying minute variations in radiographic image grayscale values, can provide NDE analysts with tools to accurately measure the thickness of the underlying image.

Exemplary methodology as applied to industrial images can be as follows:

1. The thickness of material in the radiographic image directly modulates or attenuates radiation (or other transmissive scanning mechanism) passing through the material. Radiation reaching the film or digital sensor interacts with the film or sensor to provide a grayscale tonal image corresponding to the radiation exposure level. The grayscale tonal value can be calibrated by use of a thickness reference block, so that an accurately dimensioned Z-axis, or thickness dimension, is presented in the 3D surface image. Certain mathematical correction factors can be built into the imaging software to correct for possible distortions caused by radiation physics. Once the radiograph is in digital format (either through scanning of physical film, or through direct digital capture, or otherwise as desired), the software herein measures the grayscale variations and projects them as a 3D surface. In rendering the surface, the software can incorporate algorithms to correct for any distortions created by radiation physics. Surface elevation variations in the image will correspond to actual thickness of the material in the radiograph image.

2. Calibration of the image intensity/surface elevation to material thickness via the radiographic image can be accomplished by including reference objects of known thicknesses or other standards in the radiographic image field of view. Commonly, Image Quality Indicators (IQIs) are specified by ASTM (American Society of Testing and Materials) and ASME (American Society of Mechanical Engineers) to verify industrial radiographic image quality sharpness and contrast sensitivity. Similarly, step wedge thickness blocks can be included for reference to grayscale intensity versus thickness. These same reference items can be used with the systems and software herein to calibrate the grayscale intensity to the Z-axis (thickness) scale, labeling the scale with units and increments of thickness.

3. As part of the implementation, known step wedge thickness values or other comparison standards can be depicted in the software corresponding to the grayscale value of that target region of the image. Multiple step wedge thickness regions, covering the thickness range of the material in the image, can be entered as calibration values into the software. In this manner, grayscale values depicted as a 3D surface in the software and actual thickness values can be co-related to one another (calibrated). The software can dimension the grayscale intensity axis (Z-axis) with incremental values of thickness (inches, millimeters, and similar).

4. The radiographic grayscale intensity image can be represented as a 3D surface, where peaks and valleys of Z-axis "elevation" will correspond to shadows and highlights (or vice versa), for example. In radiographic images, highlights are areas of greatest radiation attenuation (thickest material) and shadows are areas of least attenuation (thinnest, or no material). The software can display the thinnest locations as valleys and the thickest materials as high elevations or peaks (or vice versa). In this way, the 3D surface image becomes an intuitive representation of material thickness in the radiograph. Elevation or thickness demarcations (contour lines) can be readily applied. A variety of other software tools are available to aid in exact mapping or measurement of the thickness represented in the image.

5. This aspect is also applicable to detection and measurement of corrosion in materials, detection of thickness and degradation of layered materials (thickness of paint on painted metallic surface), and similar inspection areas. By allowing expert examiners to visualize defects more clearly and intuitively, it can also assist in pattern recognition and automated defect detection. In effect, if the people who write pattern recognition algorithms can see defect patterns more clearly through 3D depiction of grayscale patterns and thickness, they can then write more precise algorithms—which can improve defect recognition.

6. FIGS. 9-13 demonstrate an exemplary implementation of this method using the software.

Uses of such a tool can include measurement of storage tank wall thickness, piping wall thickness, castings quality, as well as any other conventionally radiographed object or material. If desired, an object of known thickness (e.g., step wedge) or other standard can be included in the field of view to provide a thickness versus grayscale calibration reference, but in other respects, normal radiographic procedures can be applied if desired. In this manner, large areas of the radiographic image can accurately portray the object thickness. Correction factors taking into account the geometric arrangement of point source radiation, object being radiographed, and the radiation sensor/detector producing the image can be included in the calibration, software or otherwise, of image intensity to material thickness.

In one embodiment, these methods, systems, etc., provide for area-wide measurement of the thickness of homogenous material (or other suitable material) using conventional radiographic image acquisition. In one embodiment of carrying this out, ASTM and ASME radiographic requirements include the use of IQI as well as step wedge reference objects. Use of step wedge object(s) in the radiographic image field of view provides a suitable reference object, if needed, for grayscale versus thickness calibration using the software interface. Along with geometric correction factors, the reference object is used to calibrate, or quantify thickness in the entire field of view.

By exemplary comparison, conventional practice requires manual use of a densitometer instrument as the step wedge and an individual location in the image to provide a thickness measurement at that point. Each additional point of thickness measurement requires repetition of the measurement process. The end result is a tabulation of measurements data, as compared to a 3D surface image representation of object thickness. Further, the image rendered in the software of the present innovations is quantitatively accurate for thickness, and the software interactivity provides statistical, area-wide, as well as point specific thickness information.

In another embodiment, the systems, etc., provide improved effectiveness of thickness evaluations based upon radiographic methods of scanning a substrate then viewing it or analyzing it using the methods herein. The thickness measurement methods may be applied to digitized film images as well as digital radiographic methods. The method provides a common mode means of thickness determination regardless of radiographic method or image type.

Figure 9:
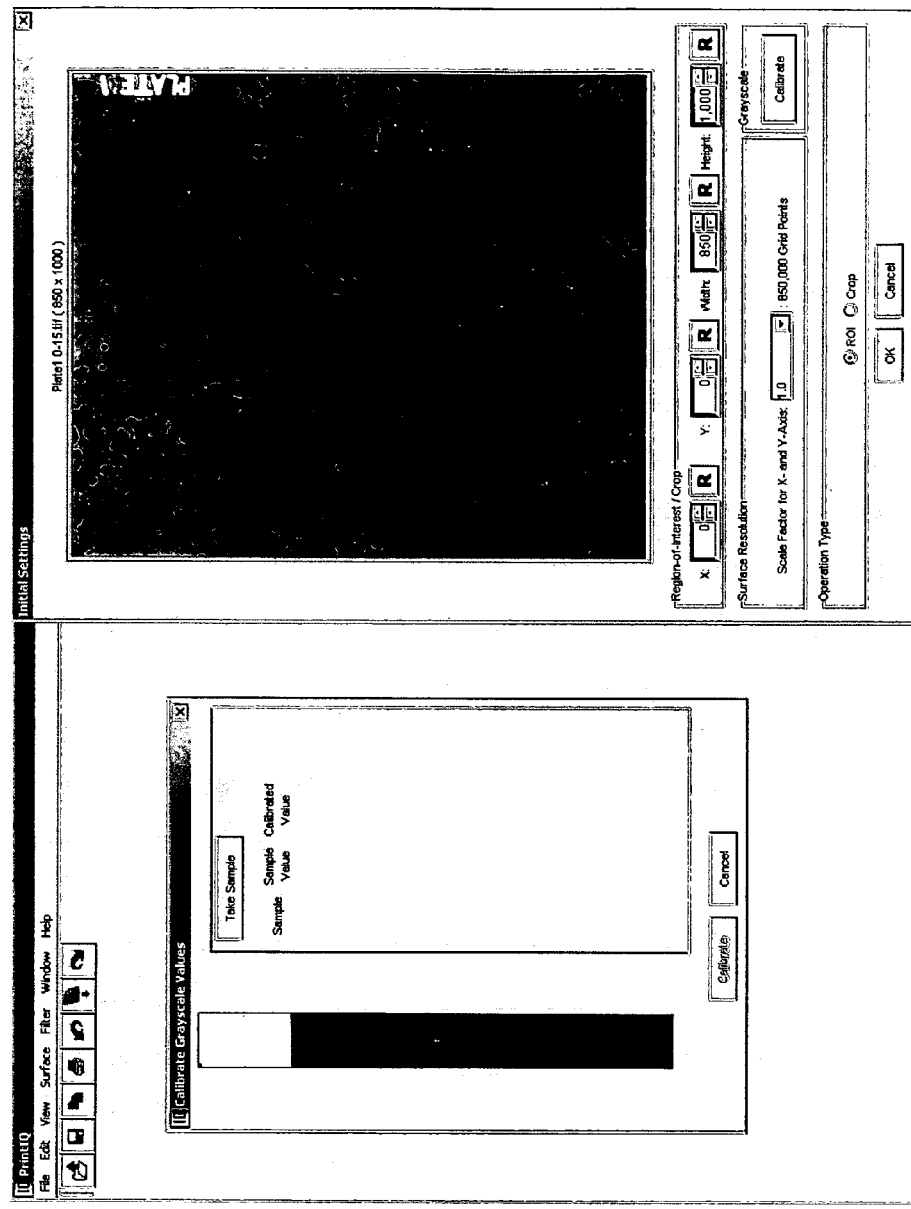
FIG. 9 depicts a screen capture of a computer-implemented system providing magnitude enhancement analysis and able to determine thickness values to provide intermediate thickness values with respect to an object of interest.
Figure 10:
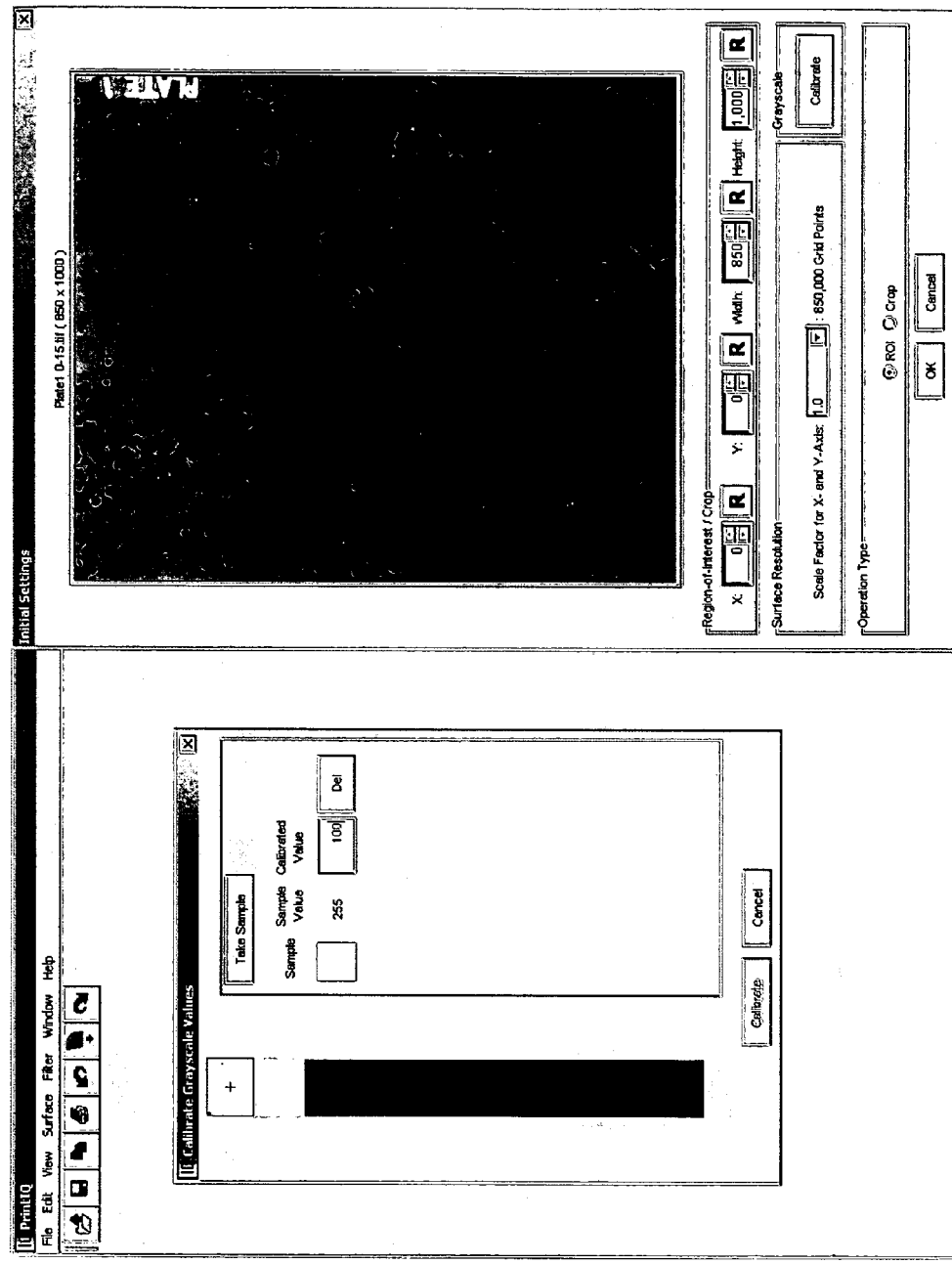
FIG. 10 depicts a further screen capture of a computer-implemented system as in FIG. 9.
Figure 11:
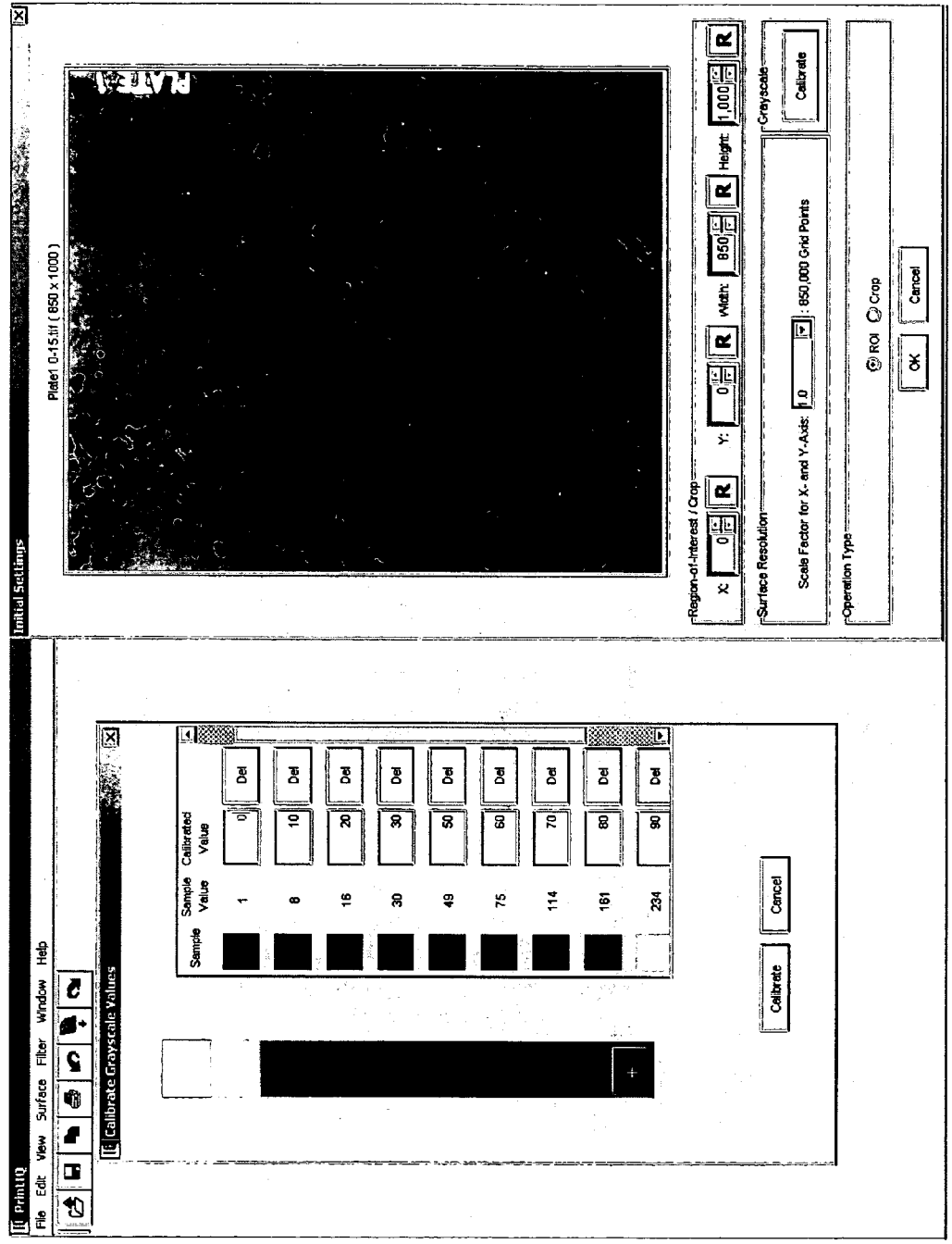
FIG. 11 depicts a further screen capture of a computer-implemented system as in FIG. 9.
Figure 12:
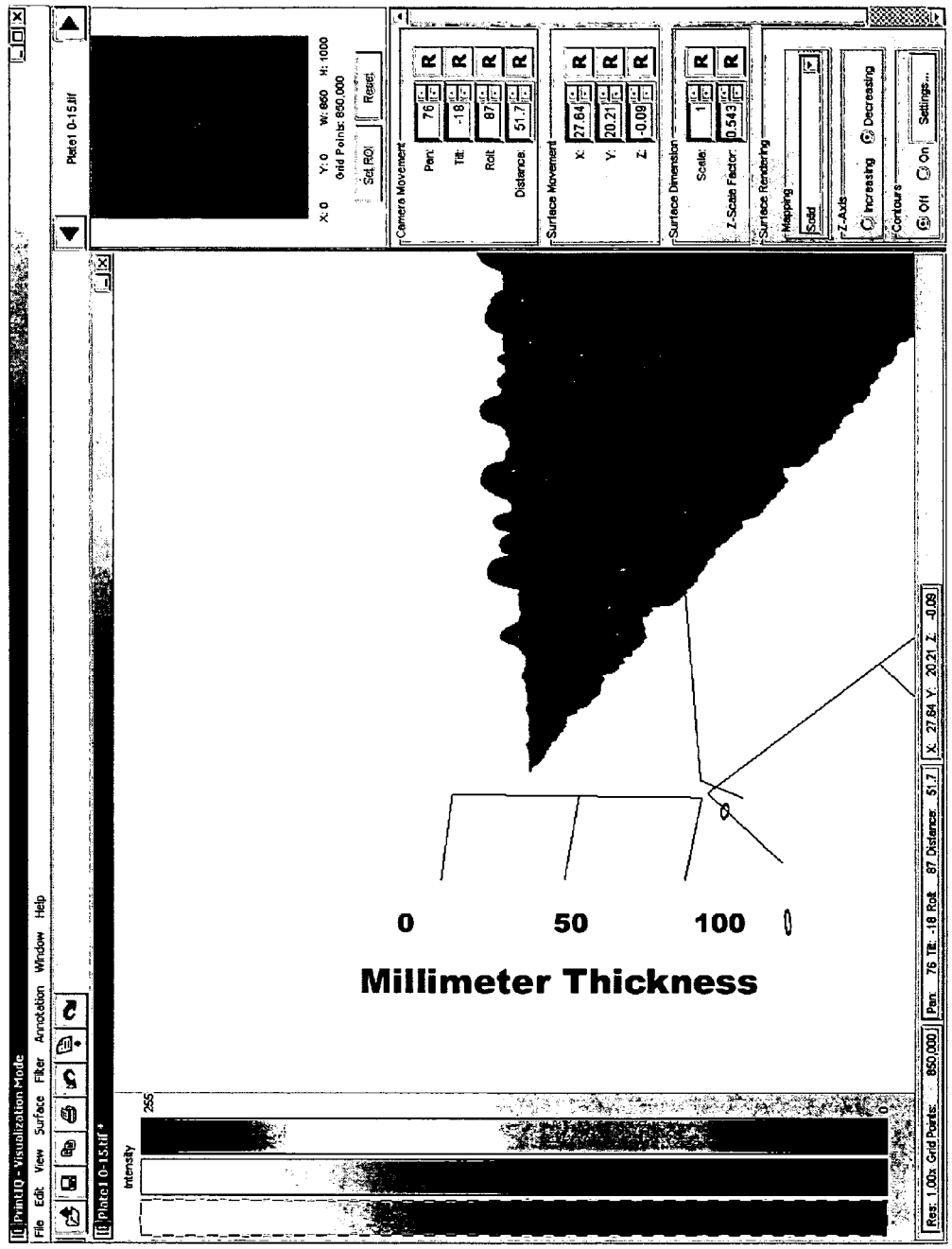
FIG. 12 depicts a further screen capture of a computer-implemented system as in FIG. 9.
Figure 13:
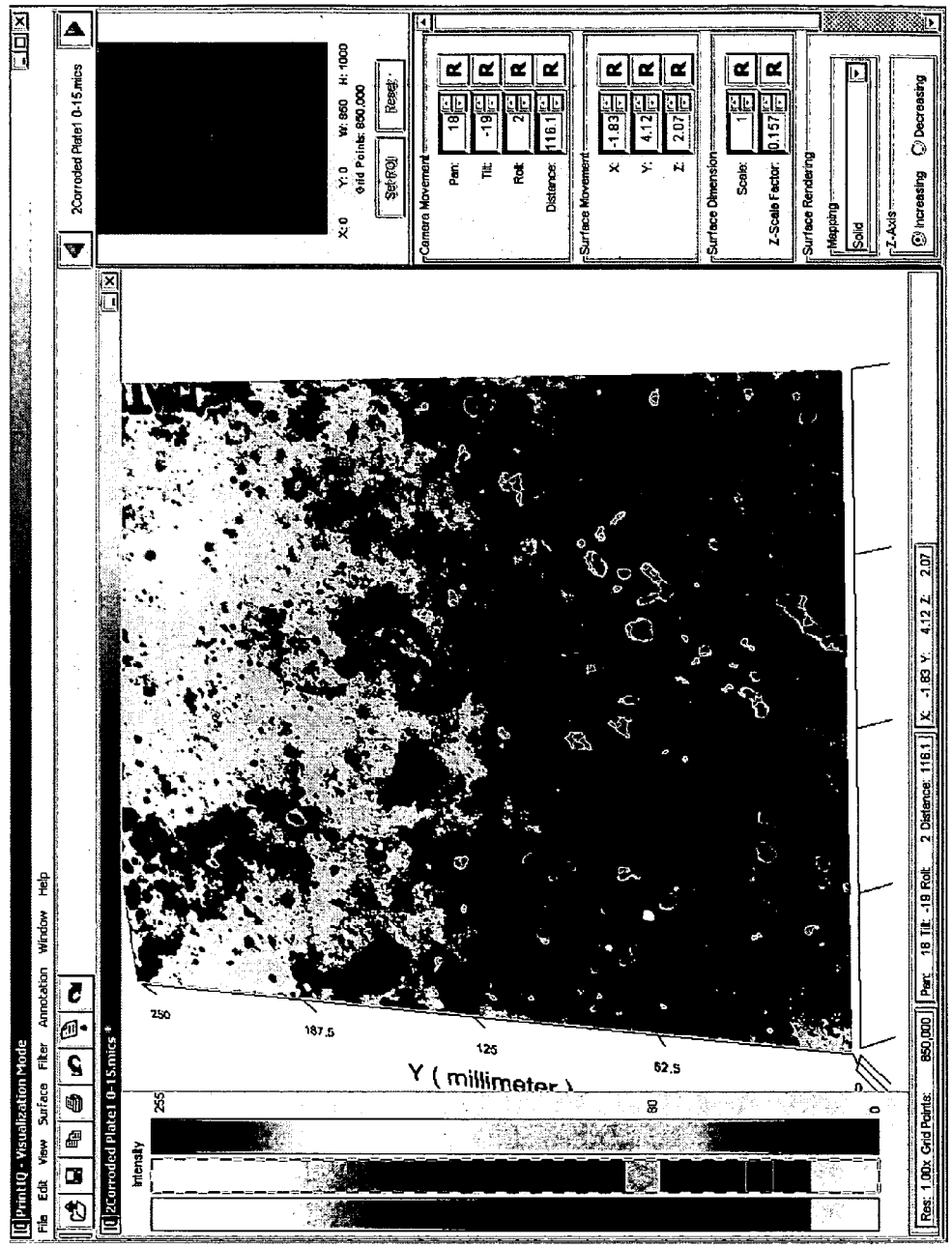
FIG. 13 depicts a further screen capture of a computer-implemented system as in FIG. 9.

The following paragraphs discuss an exemplary thickness measurement work flow process.
1. As shown in FIG. 9 perform a radiographic imaging procedure, typically per accepted industry code requirements. The image can have a suitable thickness reference object in the field of view (e.g., a step wedge).
2. The reference object properties can:
   a. be identical material to object of interest,
   b. have thickness values to provide intermediate thickness values with respect to the object of interest,
   c. be located adjacent to object of interest.
3. Typically, if the image is a film radiograph, convert the film by electronic image scanning or other desired procedure to provide a digital file. If the image is a direct digital radiograph, no additional conversion may be desired.
4. Import, or "open" the digital file using magnitude enhancement analysis software. Perform thickness calibration to grayscale values using the exemplary interactive grayscale calibration tool in software in FIGS. 9 and 10.
5. As shown in FIG. 10 each subsection of the grayscale target has a known thickness value by design and construction of the target (step wedge). Using the mouse to select each subsection (one at a time) and then clicking "Take Sample" produces the following result. The numbered numerical value under "calibrated value" is the actual material thickness value entered by the operator for the sampled portion of the grayscale target (step wedge). This and certain other steps can be automated, if desired.
6. As shown in FIG. 11, repetition of this procedure can sample additional regions of the grayscale target until completely sampled. The "Calibrate" button is clicked, resulting in adjustment of the Z-axis to reflect the thickness values entered numerically. As with the previous steps, this and certain other steps can be automated, if desired.
7. As shown in FIG. 12, once tonal values and thickness values are calibrated, and corrected for radiation physics effect due to factors such as point source radiation targeting a flat plate, the image can be viewed as a quantitative representation of material thickness, as shown below. This demonstration example uses millimeter as the thickness unit of measure.
8. As shown in FIG. 13, existing additional software tools can be used for evaluation of material thickness throughout the image region. The example below demonstrates the use of pseudo-color tools. The thinnest regions of the plate have been made invisible, allowing the white background "shows-through" the plate. Deeper blue tones correspond to equal thickness values, and lighter blue tones correspond to another set of equal thickness values.

Turning to another aspect, digital images have an associated color space that defines how the encoded values for each pixel are to be visually interpreted. Common color spaces are RGB, which stands for the standard red, green and blue channels for some color images and HSI, which stands for hue, saturation, intensity for other color images. There are also many other color spaces (e.g., YUV, YCbCr, Yxy, LAB, etc.) that can be represented in a color image. Color spaces can be converted from one to another; if digital image pixels are encoded in RGB, there are standard lossless algorithms to convert the encoding format from RGB to HSI.

The values of pixels measured along a single dimension or selected dimensions of the image color space to generate a surface map that correlates pixel value to surface height can be applied to color space dimensions beyond image intensity. For example, the methods and systems herein, including software, can measure the red dimension (or channel) in an RGB color space, on a pixel-by-pixel basis, and generate a surface map that projects the relative values of the pixels. In another example, the present innovation can measure image hue at each pixel point, and project the values as a surface height.

The pixel-by-pixel surface projections can be connected through image processing techniques (such as the ones discussed above for grayscale visualization technology) to create a continuous surface map. The image processing techniques used to connect the projections and create a surface include mapping 2D pixels to grid points on a 3D mesh (e.g., triangular or rectilinear), setting the z axis value of the grid point to the appropriate value (elevating based on the selected metric, e.g., intensity, red channel, etc.), filling the mesh with standard 3D shading techniques (Gouraud, flat, etc.) and then lighting the 3D scene with ambient and directional lighting. These techniques can be implemented for such embodiments using modifications in Lumen's grayscale visualization software, as discussed in certain of the patents, publications and applications cited above.

Virtually any dimension, or weighted combination of dimensions in a 2D digital image, can be represented as a 3D surface map. Other examples include conversion of the default color space for an image into the HLS (hue, lightness, saturation) color space and then selecting the saturation or hue, or lightness dimensions as the source of surface height. Converting to an RGB color space allows selection of color channels (red channel, green channel, blue channel, etc.). The selection can also be of single wavelengths or wavelengths bands, or of a plurality of wavelengths or wavelength bands, which wavelengths may or may not be adjacent to each other. For example, selecting and/or deselecting certain wavelength bands can permit detection of fluorescence in an image, detect the relative oxygen content of hemoglobin in an image, or breast density in mammography.

In addition, the height of each pixel on the surface can be calculated from a combination of color space dimensions (channels) with some weighting factor [(e.g., 0.5 * red+0.25 * green+0.25 * blue), or even combinations of dimensions from different color spaces simultaneously (e.g., the multiplication of the pixel's intensity (from the HSI color space) with its luminance (from the YUV color space)).

The present innovations can display 3D topographic maps or other 3D displays of color space dimensions in images that are 1 bit or higher. For example, variations in hue in a 12 bit image can be represented as a 3D surface with 4,096 variations in surface height.

In another embodiment, the methods, systems, etc., are directed to enhanced perception of related datasets. Outside of color space dimensions, the height of a gridpoint on the z axis can be calculated using any function of the 2D data set. A function to change information from the 2D data set to a z height may take the form f(x, y, pixel value)=z. All of the color space dimensions can be of this form, but there can be other values as well. For example, a function can be created in software that maps z height based on (i) a lookup table to a Hounsfield unit (f(pixelValue)=Hounsfield value), (ii) just on the 2D coordinates (e.g., f(x,y)=2x+y), (iii) any other field variable that may be stored external to the image, or (iv) area operators in a 2D image, such as Gaussian blur values, or Sobel edge detector values.

The external function or dataset is related in some meaningful way to the image. The software, etc., can contain a function g that maps a pixel in the 2D image to some other external variable (for example, Hounsfield units) and that value can then be used as the value for the z height (with optional adjustment). The end result is a 3D topographic map of the Hounsfield units contained in the 2D image; the 3D map would be projected on the 2D image itself.

Exemplary Medical Imaging Applications using Contrast Agents

Many medical (and other) imaging procedures including magnetic resonance imaging (MRI), a computed tomography (CT) scan imaging, and positron emission tomography (PET) scan imaging rely on contrast to enhance the conspicuity of findings. Contrast exams can produce images over time, e.g., a base-line image is acquired, then the patient is administered a contrast agent, and then many images are acquired. Contrast agents affect signal intensity, so the series of images shows the relative uptake of contrast in various parts of the body over time. In the case of Nuclear Medicine images, the contrast agent directly emits the detected signal so pre-contrast images may not be acquired. If desired, a comparison image may be chosen from one of the pre- or post-contrast images. In other embodiments, imaging systems can obtain images of a given target area over time, such as a tumor, localized infection or lesion.

Surface map systems and methods, etc., such as those discussed in the references incorporated above, can be applied to time series data. In one embodiment, surface maps are applied to a series of registered images where pixel intensity differences between pairs of images represents a corresponding change in a real world value, e.g., difference in metabolic activity, decay of a contrast agent, etc. The computer (typically via software) creates the surface such that the z-value of each point in the surface represents the difference in intensity between two of the images, or the interpolated difference based on a function of time. The software dynamically updates the z-values of the surface over a period of time to show a cine of the change in the real world value based on the snapshots and interpolation. The difference can be, for example, from a single base image, or can be the pairwise difference between one or more neighboring images. The mathematical operation used to define the z-value may be a function other than simple arithmetic difference (e.g., percent change, or some more complex function of the image series).

In one aspect, the uptake (and/or washout) of the contrast is visualized by using the change in signal intensity to create a correspondingly changing 3D surface. The 2D (position) and color, grayscale, etc., data come from the normal MRI or other images, and the z-value for each grid-point on the surface is calculated from the current uptake/washout of the contrast agent at that point in the anatomy (e.g., by subtracting the pixel intensity value at the current time slice from the corresponding pixel value in the base-line image, or one of the previous slices).

Examples of contrast agents include but are not limited to fluorescent probes, fluorescent-, enzyme- or radio-labeled antibodies, barium sulfate contrast agent, an iodinated contrast agent, an ionic contrast agent such as acetrizoic acid derivatives, diatrizoic acid derivatives, iothalamic acid derivatives, ioxithalamic acid derivatives, metrizoic acid derivatives, iodamide, lypophylic agents, aliphatic acid salts, iodipamide and ioglycamic acid; and an nonionic contrast agent such as gadolinium, metrizamide, iopamidol, iohexol, iopromide, iobitridol, iomeprol, iopentol, ioversol, ioxilan and a nonionic dimeric contrast agent. Examples of nonionic dimeric contrast agents include iodixanol or iotrolan.

In another aspect, the given contrast element is associated with target such as a tumor, localized infection or lesion that has not been treated with a contrast agent, or other target as desired. In such embodiments, the z-value can be configured, for example using filters or color management schemes, such that the z-value is determined by substantially only a given wavelength or wavelength band corresponding substantially only to the particular contrast agent(s) or other target under review. If desired, multiple contrast agents can be used.

This approach of displaying contrast over time is referred to herein as a Dynamic Contrast Visualization (DCV) Map of the time series data. In certain embodiments, the images in the time series can be registered to account for movement of the patient over time. The z-value may be multiplied by a constant or variable that affects the overall height of the surface (global height control).

Exemplary Illustrations

The images of FIGS. 14-17 illustrate one of the desired effects. The images in the series are from a Breast MRI study done with contrast. There are three images from the series:

1. The base-line MRI image before contrast was administered to the patient.
2. A post contrast MRI image that shows increased intensity in certain areas, representing more of the contrast agent in the patient's tissues 3. A second post contrast MRI image, several minutes after the second image.

All of the images were registered so that the pixels representing a certain location in the patient's body were in the same x, y location in each image. Each MRI was then rendered using the DCV process described above.

Figure 14:
FIG. 14 is a Dynamic Contrast Visualization (DCV) view of a base-line MRI with the surface tilted. The images of FIGS. 15-17 are DCV views with the same tilt. The base-line DCV shows the MRI view before a contrast agent was administered to the patient.

FIG. 14 is a DCV view of the base-line MRI with the surface tilted. All subsequent images are DCV views with the same tilt. The base-line DCV shows the MRI view before the contrast agent was administered to the patient.

Figure 15:
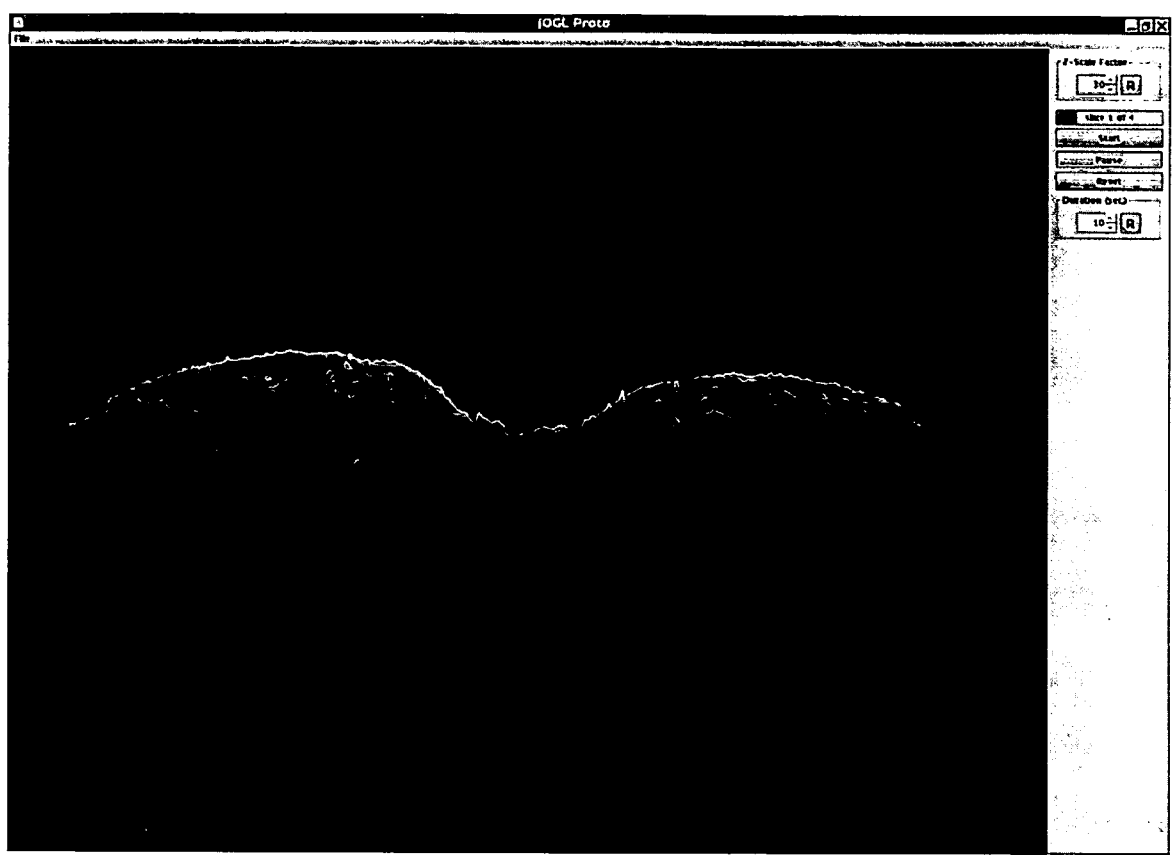
FIG. 15 shows a first post-contrast DCV view. The z-values in the DCV represent the difference in intensity values between the base-line MRI and the first post contrast MRI. There is already visible a "mountain" in the left breast (right side of image) near the chest wall that represents a concentration of the contrast agent in that area, possibly due to a lesion.

FIG. 15 shows a first post-contrast DCV view. The z-values in the DCV represent the difference in intensity values between the base-line MRI and the first post contrast MRI. There is already visible a "mountain" in the left breast (right side of image) near the chest wall that represents a concentration of the contrast agent in that area, possibly due to a lesion.

This view shows that the physician or other viewer is offered a view that simultaneously shows the contrast uptake "curves" for all pixels at a single time slice. This allows the physician to view the "morphology of the tumor" at each point in time during the DCV visualization.

Figure 16:
FIG. 16 shows a DCV view of a second post contrast MRI taken several minutes after the MRI image in FIG. 2. The white peak has grown noticeably since the previous DCV view.

FIG. 16 shows a DCV view of a second post contrast MRI taken several minutes after the MRI image in FIG. 15. The white peak has grown noticeably since the previous DCV view.

Exemplary Further Embodiments

1: Absolute Difference From Baseline.

In this embodiment, the z-height for each grid-point on the surface is calculated as the absolute difference between the pixel in the baseline image and the pixel in the current time slice image.

2: Absolute Difference From Baseline With Interpolation.

This is an extension of embodiment 1 where there are additional images computed by linear interpolation of the data between time t (n) and t (n+1). E.g., if time t(n) is 15 minutes into the procedure and t(n+1) is 20 minutes into the procedure, this embodiment allows generation of computed images between 15 and 20 minutes, e.g., a computed 3D surface for t=17 minutes where the z-values are the linearly interpolated values between t=15 and t=20. The values can also be interpolated using non-linear approaches. This embodiment may also interpolate the grayscale values between the two images.

3: Absolute Difference From Baseline With Physiologically-Based Interpolation.

This is similar to embodiment 2, except the linear interpolation is replaced by an interpolation that is based on known physiological parameters of contrast uptake/outflow. E.g., this can account for a known non-linear contrast absorption rate.

4: Cine Applied to Any of the Other Embodiments

In this embodiment, the 3D surface is animated such that it starts with the baseline image and all z-values are set to 0. Then each subsequent time slice, or interpolated time slice, causes the 3D surface to morph its z-values to show the surface at that time slice or interpolated time slice. The result is an animation of the contrast uptake and outflow over time at each pixel in the images.

5: Image Fusion

An embodiment where the series of images come from two or more different modalities such as PET/CT fusion. In one embodiment, the 2D data and colors come from the CT images, while the z-value information comes from the PET images over time. This embodiment allows visualization of the metabolic activity represented by the PET images, while maintaining the familiar look of the CT anatomy and grayscale.

6: Percent Change

In this embodiment, instead of the difference between the baseline and the current image, the z-values are the percent change from between the two images or other desired comparison images.

7: Pair-Wise Differences.

In this embodiment, the differences are not between the base image and a time slice, but between two adjacent images in the time series.

8: Distance From Center

In this embodiment, the z-value is computed from an average of a center point and N surrounding points.

9: Threshold Plane Visualization

This embodiment comprises adding one or more planes parallel to the X, Y plane of the image, and at a constant z-value that represents a threshold. The plane(s) is rendered in a semi-transparent manner so that it is clear which parts of the surface are above the threshold and which parts are below the threshold. The plane may be colored or some grayscale shade.

Figure 17:
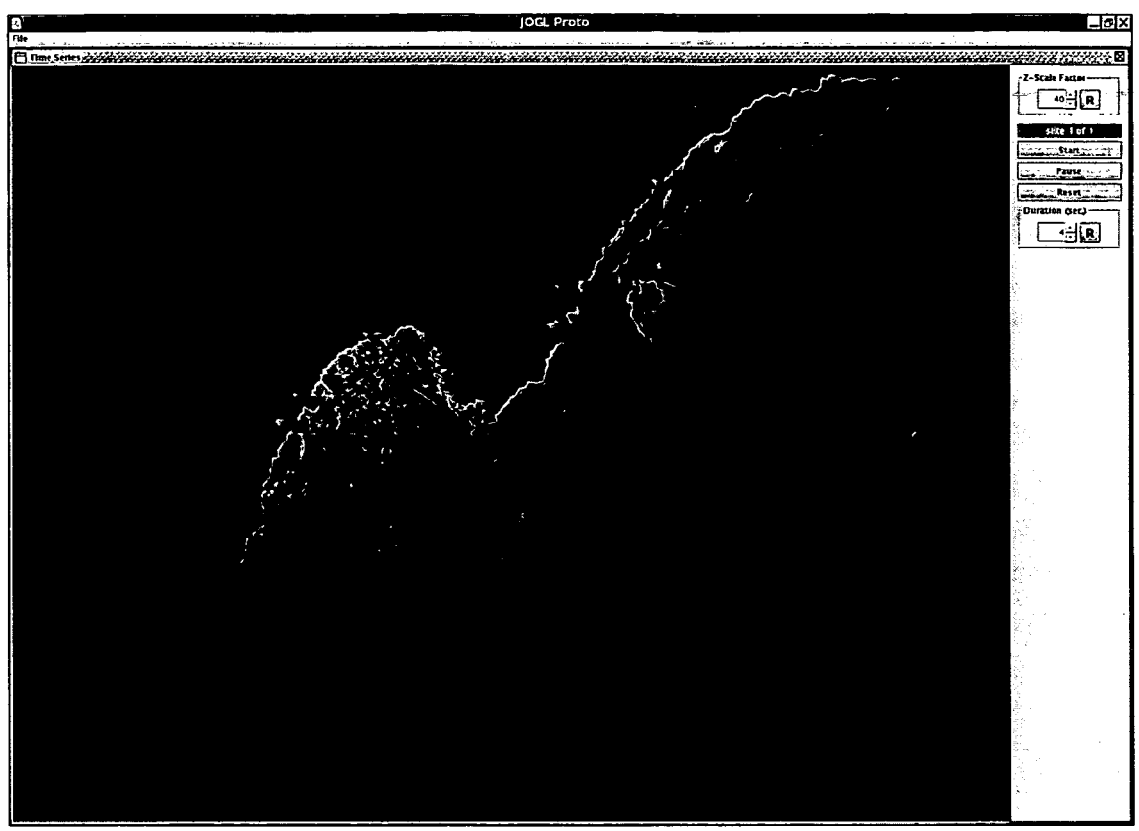
FIG. 17 shows adding one or more planes parallel to the X, Y plane of the image, and at a constant z-value that represents a threshold. The plane(s) is rendered in a semi-transparent manner so that it is clear which parts of the surface are above the threshold and which parts are below the threshold. The plane may be colored or some grayscale shade.

FIG. 17 shows an example using a blue translucent visualization plane.

10: Threshold Via Colored Surface

It can be desirable to highlight grid points that exceed certain thresholds with color or other distinctive marker. Similarly, the image can be rendered such that different topographical layers are each assigned their own color, which can be incremental or continuous.

11: Manual Control Of The Visualization

In this embodiment, a user control, e.g., a slider marked with each original and/or interpolated image time tick, can be controlled by the user so that the user can move forward and backward through the time series and see the DCV view over a time range and at a speed controlled by the user. This would allow the user to study a certain time/spatial area of interest.

12: Cine Loop Client-Server Application

In this embodiment, a server with the appropriate hardware and processing power, can render the DCV image with preset duration and interpolation, and turn it into a standard avi or other video format for simple play back by a PC with video and graphics hardware such as standard commercially available video and graphics hardware. This could be through a LAN or a web browser front end, as the processing power will have been done by the server, and can be wired or wireless or otherwise as desired.

13: Staging The Images

In this embodiment, the software automatically selects the appropriate images from a DICOM study or series, registers the images, and sets up the DCV view based on the selected and processed images.

14: Interpolation Of The Colors

In this embodiment, the gray-scale color applied to each pixel is based on the interpolated value between the same data that the z-value is interpolated between. In certain other embodiments, the color is that of the base-image.

15: Other Slice Color

In this embodiment, the gray-scale color applied to each grid-point on the DCV surface is the gray-scale or color of one of the non base-line images (e.g., the current image or the last image).

Exemplary Implementation Strategies

This section outlines some implementation strategies that use the power of current 3D graphics cards (GPU) to do much of the work rather than the normal method of calculating all of this on the system processor (CPU). Other approaches are also suitable, including processing on a CPU.

Modern graphics cards contain programmable vertex processors and programmable fragment processors (see the OpenGL specifications for terminology and an overview of a standard graphics card processing pipeline). The programs that are downloaded to the vertex and fragment processors are known as "shaders". In the following implementation strategies, there are several approaches to writing a shader that harness the power of the GPU afforded by the programmable processors.

In the following discussion, the "timing signal" typically comes from the system CPU, either representing real world time ticks, or virtual time ticks that correspond to user input via a control or from a pseudo time tick generated by the system in a batch processing mode. In all cases, the time tick represents a point in time in the underlying image time frame (e.g., if time=0 is the base image MRI, and time=5 minutes is the time the first post-contrast image was taken, then time=2.5 minutes would be an interpolated value between the intensity values in the base-line image and the first post contrast image).

1: Vertex Shader Texture Access

In this strategy, the geometry for the base-line image is calculated in the normal way and passed onto the graphics card. Subsequent time slice data is passed to the graphics card as 2D textures. A vertex shader program is loaded onto the GPU which calculates the difference from the base-line geometry, the current time slice (for interpolation) and one of the 2D textures intensity values. The current time slice allows the vertex shader program to interpolate a point between the base-line geometry and the current time slice texture.

The following equation represents pseudo-code for one possible implementation of the shader algorithm (without all of the supporting code):

```
// curBase is the z-value representing the difference between // the base-
line image and the last completed image in the // time series data.
float curBase = ( prev – base
);
// curInterp is the interpolated percentage delta we will add to // curBase
that represents the percent of the way we are from the // previous image
to
the time represented by the next image in // the time series. I.e., if the
current time slice is equal to // the time of one of the images, then this
term will be 0. float curInterp = ( current – prev ) * timeTickPercent;
// The final term is the base plus the current interpolated
// delta, times the global scale factor, which just acts as
// a magnification to scale all the surface heights by some
// amount to a visually satisfying value.
float devZValue = ( curBase + curInterp ) * globalScaleFactor
```

2: Vertex Shader Attributes

In this strategy, the intensity information for the time series images is encoded as per-vertex attributes. The vertex shader program does the same calculations as in the previous strategy, except that it accesses one of the per-vertex attributes instead of a texture for the intensity information.

Exemplary Dental Uses of Zak Technology

1. Introduction

Currently, dental imaging—for example for purposes of diagnoses or forensic investigation—is either film-based or digital. As film-based systems are replaced, digital capture, storage and analysis systems usually take their place. Even where film-based systems remain in place, film images can be scanned into digital format and then analyzed by the practitioner.

To facilitate more accurate diagnoses and interpretations, LumenIQ, Inc. ("Lumen") has developed a software analysis tool that displays grayscale (also referred to as "image intensity") data and in a 2D digital image as a 3D topographic map or other 3D-display comprising depicting gray scale or other visual cues (e.g., hue, saturation) on the Z-axis, which image can then be identified, rotated, flipped, tilted, etc. Such images can be referred to as Z-axis kinematic ("ZAK") images, although the kinematic aspect need only be present when desired. This visualization method allows the human visual system to overcome its inherent weakness at discerning subtle differences in image intensity patterns in a 2D image. Lumen has several issued patents and patent applications that relate to this technology and analysis method, as noted previously.

The present invention relates to the application and use of Lumen's 3D visualization technology to improve the analysis of dental radiography images, and thereby enhance diagnostic capabilities.

2. Clinical Applications of the Analysis Tool

Figure 18:
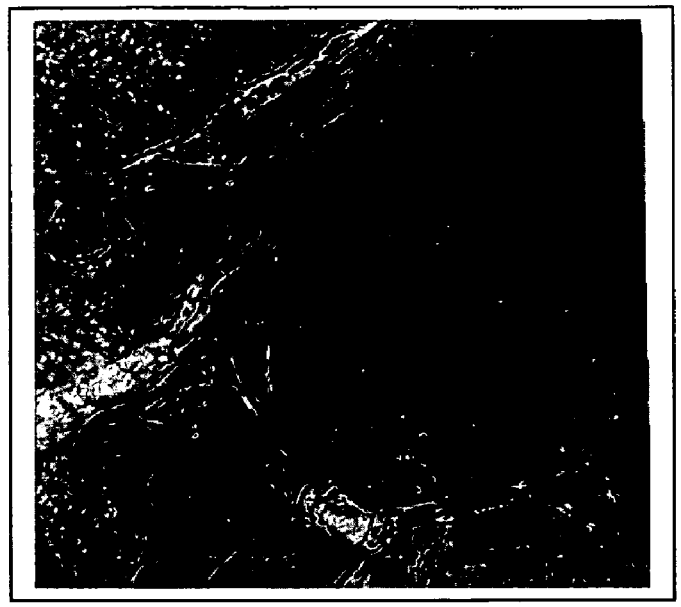
FIG. 18 shows visualization of maxillary sinus cephalometric views using 3D Z-Axis Kinematics (ZAK) visualization of grayscale data of the present invention.
Figure 19:
FIG. 19 shows visualization of maxillary sinus cephalometric views using standard film.

Lumen's analysis tools and methods are useful in a wide variety of dental image interpretation tasks, including the following:

a. Improved Discrimination of Anatomic Features 3D visualization (ZAK) of grayscale data facilitates the ability to see and interpret skeletal or other anatomy that the human visual system cannot see clearly. Specific examples include visualization of maxillary sinus cephalometric views (FIGS. 18 and 19) and comparison of trabecular bone in the mandible. In some embodiments, LumenIQ ZAK software ("ImageIQ") can be used with the point source lighting feature combined with z axis elevation.

b. More Accurate Interpretation of Pathologic Anatomies Caused By Disease

ImageIQ contains color mapping and contour line mapping functions. The color mapping function maps a distinct color value to each different grayscale value. The contour mapping function assigns a distinct contour band to each grayscale in an image. Use of these tools, together with 3D grayscale depiction, can influence clinical outcomes such to allow the practitioner to more effectively determine the extent or severity of dental skeletal (intra-bone) pathologies.

Figure 20:
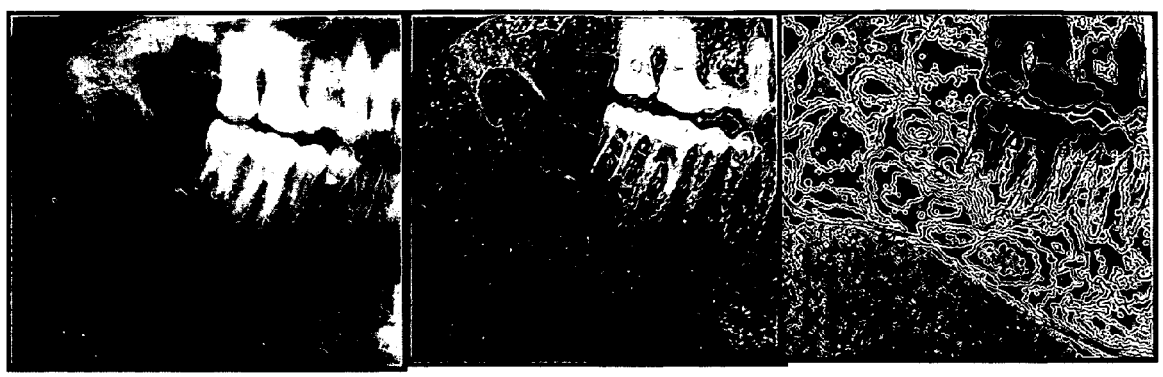
FIG. 20 shows a sequence of films in which, the standard film image (far left) shows a multilocular radiolucency where the disease process appears to extend anteriorly beyond the $2^{nd}$ premolar and inferiorly to the $1^{st}$ premolar but is unclear as to what is clinically involved near the apex of the canine. The renderings of the same image in ImageIQ (middle and far right) more clearly differentiate potential tumor extension toward the front of the mouth (anterior). Furthermore, the variance in color assignment (yellow, light green, blues etc)—indicating a variation in grayscale values—and topography contours may correlate with the degree of bone loss, and would thus assist in determining whether there is involved (lesional) tissue present.

In the image sequence in FIG. 20 the standard film image (far left) shows a multilocular radiolucency where the disease process appears to extend anteriorly beyond the $2^{nd}$ premolar and inferiorly to the $1^{st}$ premolar but is unclear as to what is clinically involved near the apex of the canine. The renderings of the same image in ImageIQ (middle and far right) more clearly differentiate potential tumor extension toward the front of the mouth (anterior). Furthermore, the variance in color assignment (yellow, light green, blues etc)—indicating a variation in grayscale values—and topography contours may correlate with the degree of bone loss, and would thus assist in determining whether there is involved (lesional) tissue present.

Analysis of dental images in LumenIQ software can also facilitate enhanced interpretation of the following pathologies (this list is not exclusive):

a. tumor borders
b. periodontal bone defects
c. relationship of dental pathologies to host tissues
d. identification of caries
e. microleakage around a restoration In all of these cases, features such as color mapping or contour mapping may be added to the 3D visualization to assist with analysis. In some cases it will be helpful, in others it will not be.

c. Improved analysis of relationships between dental structures, such as the border or interface between a prosthetic device and surrounding bone or other vital structures Successful diagnoses and the execution of treatment procedures often depend upon an accurate visualization of the interface between different surfaces. Use of LumenIQ software can improve the accuracy of this determination versus use of standard 2D dental radiographs.

Figure 21:
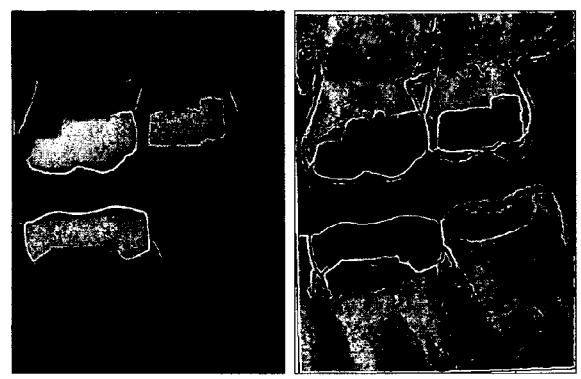
FIG. 21 shows images in which determination of the border between pulp tissue and a restorative pin is difficult to determine with accuracy when viewing a 2D image. Visualization of the same image as a 3D topograph with color mapping facilitates improved determination of the extent of the pulp (green) vs. pin (red) in the maxillary $1^{st}$ molar (tooth #14). Better differentiation is also seen in comparing the mandibular $1^{st}$ molars (tooth #19) as well.

In the images in FIG. 21, determination of the border between pulp tissue and a restorative pin is difficult to determine with accuracy when viewing a 2D image. Visualization of the same image as a 3D topograph with color mapping facilitates improved determination of the extent of the pulp (green) vs. pin (red) in the maxillary $1^{st}$ molar (tooth #14). Better differentiation is also seen in comparing the mandibular $1^{st}$ molars (tooth #19) as well.

Figure 22:
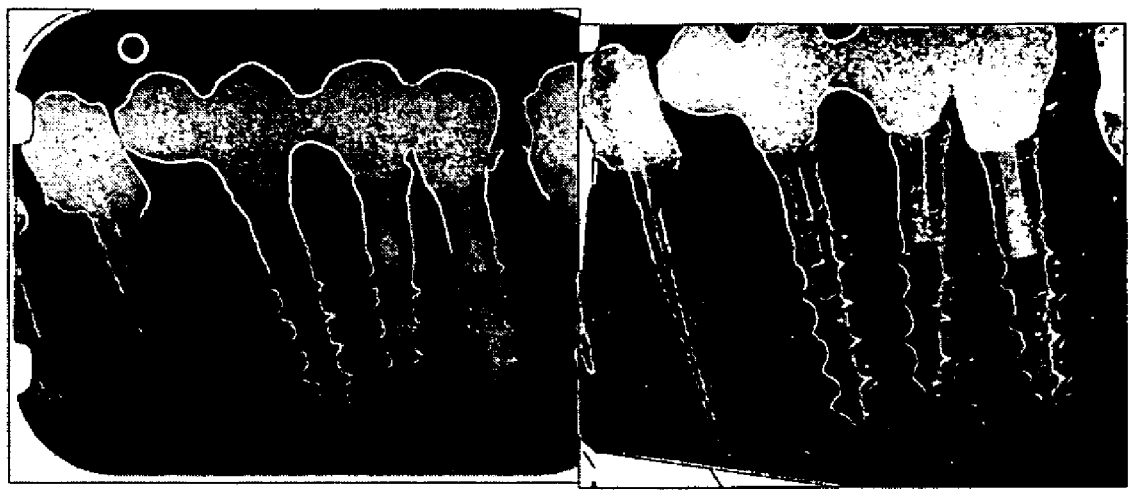
FIG. 22 shows two images, the image on the left shows a standard 2D radiograph. The image on the right, which incorporates 3D grayscale topographical visualization, combined with angled view and point source lighting, more clearly depicts the border between bone and implants.

In the two images of FIG. 22, the image on the left shows a standard 2D radiograph. The image on the right, which incorporates ImageIQ's 3D grayscale topographical visualization, combined with angled view and point source lighting, more clearly depicts the border between bone and implants.

Figure 23:
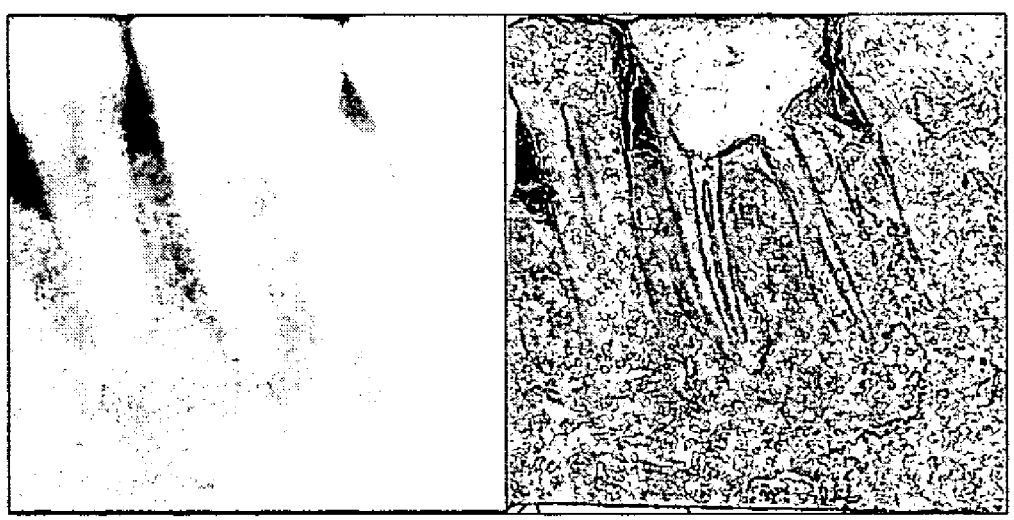
FIG. 23 shows two images of the same teeth, the poor quality image below on the left shows a 2D image of a root canal fill, side-by-side with the same image rendered. The image on the right provides better visualization of the canal filling material, extension, and relationship to the end of the tooth root.

In FIG. 23, the poor quality of the image on the left shows a 2D image of a root canal fill, side-by-side with the same image rendered in ImageIQ. The image on the right provides better visualization of the canal filling material, extension, and relationship to the end of the tooth root.

Figure 24:
FIG. 24 shows how ImageIQ assists in dental radiograph analysis by providing more accurate perception of the relationship between a pathologic process (tumor growth) and host tissues. Both images depict the identical mass in the right maxillary sinus. In the 3D topographical version rendered in ImageIQ (bottom), however, the form, shape and relationship of the tumor to adjoining tissue can be viewed more clearly—which can lead to improved surgical analysis and differential diagnosis.

In FIG. 24, the image shows how LumenIQ s toolsets assist in dental radiograph analysis by providing more accurate perception of the relationship between a pathologic process (tumor growth) and host tissues. Both images below depict the identical mass in the right maxillary sinus. In the 3D topographical version rendered in ImageIQ (bottom), however, the form, shape and relationship of the tumor to adjoining tissue can be viewed more clearly—which can lead to improved surgical analysis and differential diagnosis.

d. Additional Clinical Applications

In addition to the clinical applications described above, LumenIQ s 3D topographical analysis tool and methodology facilitates improved visualization, analysis and treatment planning in the following areas:

i. Identification of trauma (such as hairline fractures) more consistently (and/or at earlier stages), and continued ability to visualize skeletal landmarks which may assist in orthodontic planning.

ii. Improved disease classification.

iii. Efficiency gains through use of multiple pre-set image sequences, or use of LumenIQ images in computer automated detection systems.

iv. Histopathology (specifically in the cytopathology discipline): quicker identification of material in parasitized cells, chromatin patterns, nuclear cytoplasmic ratios, and microscopic organelles to help diagnostic classification of a neoplasm (tumor), or help determine whether or not there is a tumor present.

v. Forensics: Rendering an image in LumenIQ software can accentuate or improve clarity of an image border to allow for better comparison between reference images; i.e., in pattern analysis comparisons or in identification cases.

This list is illustrative, and is not intended to be exhaustive.

3. Clinical Advantages of LumenIQ Software over Existing Products and Methods

The following Sections provide a description of some of the advantages of LumenIQ software over existing visual analysis tools used in dental radiography.

a. Image Navigation Efficiency and Capability

1. Current applications may provide for free transformation (x, y axis changes and distortions) of an image but they require manipulation within multiple drop down menus or keystrokes. Some only provide rudimentary changes in orientation, i.e., limited to 90 degree rotations or vertical/horizontal flips (this is especially true with existing tools on dental digital x-ray systems).

Figure 25:
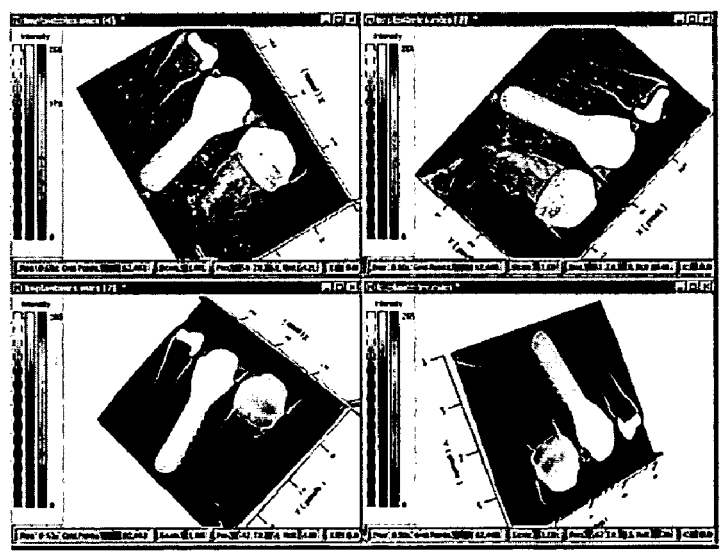
FIG. 25 shows images of a dental implant which demonstrates varied rotations in x, y and z axis, all with mouse movements instead of drop down menus and without 90 degree limitations.

LumenIQ Software Advantage:

The methods and systems herein provide enhanced capabilities and are more efficient. Specifically, just moving the mouse, combined with holding down the right, left or combined buttons is all that is needed to zoom, move the entire image or change the x, y axis of an image from 1-360 degrees. Images in FIG. 25 are of a dental implant which demonstrates varied rotations in x, y and z axis, all with mouse movements instead of drop down menus and without 90 degree limitations.

2. The roll, tilt and pan functions of the LumenIQ software allow the practitioner to obtain different perspectives on the rendered image. As the practitioner uses these functions to rotate the image, the geometric value, size and shape of the image can change. This feature can be of clinical value, as the practitioner can modify the object image to more closely correspond to the size, shape and geometric value of the reference image. The images below, which use a US Quarter as the sample image, illustrate this principle.

Perspective changes (rolls and tilts) can also be mouse driven as opposed to multiple keystrokes in order to achieve "distortions"

Figure 26:
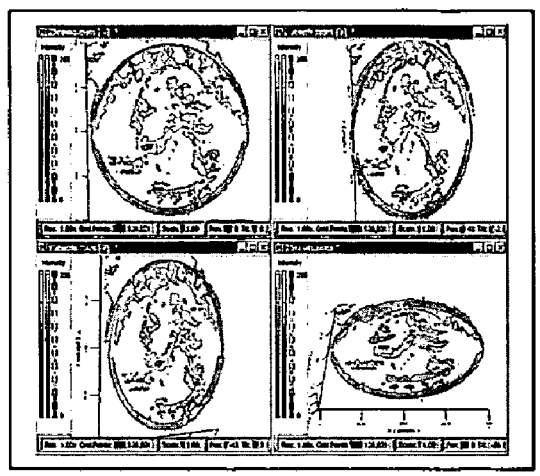
FIG. 26 shows four images. The image to the right demonstrates that as the user rolls and tilts, the overall visualized shape of the image can be "modified," notice how the circular, 25 cent piece becomes an oval or George Washington's jaw becomes relatively shorter or longer. This ability can facilitate making comparisons of an unknown to a reference, e.g., in the case of a skeletal identification, etc.

The image in FIG. 26 demonstrates that as the user rolls and tilts, the overall visualized shape of the image can be "modified," notice how the circular, 25 cent piece becomes an oval or George Washington's jaw becomes relatively shorter or longer. This ability can facilitate making comparisons of an unknown to a reference, e.g., in the case of a skeletal identification, etc.

This is also true when looking at a linear scale.

Figure 27:
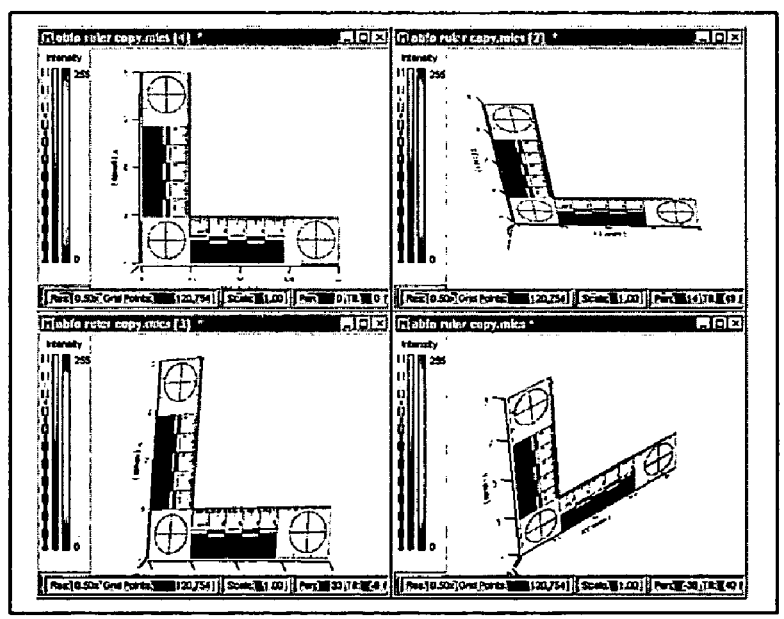
FIG. 27 depicts how the numerical value (mm) of the right angle scale, when actually measured real time, may be different depending on where you measure at some arbitrary point along the ruler, because of the ability to roll/tilt the visual perspective. This is graphically depicted when looking at the left & right arms of the ruler.

The numerical value (mm) of the right angle scale, when actually measured real time, may be different depending on where you measure at some arbitrary point along the ruler (FIG. 27), because of the ability to roll/tilt the visual perspective. This is graphically depicted when looking at the left & right arms of the ruler.

b. Current "emboss" tool in other commercial applications provides inferior topographic rendering Current emboss filters generate a vague, matte-like finish that suggests a pseudo-3D surface, but the overall clarity throughout the image of specific aspects are not up to clinical expectations. The image appears smudgy, out of focus and lacks crisp detail. While edge (image periphery) detail is improved, overall detail beyond the borders (outer perimeter) is lacking.

Figure 28:
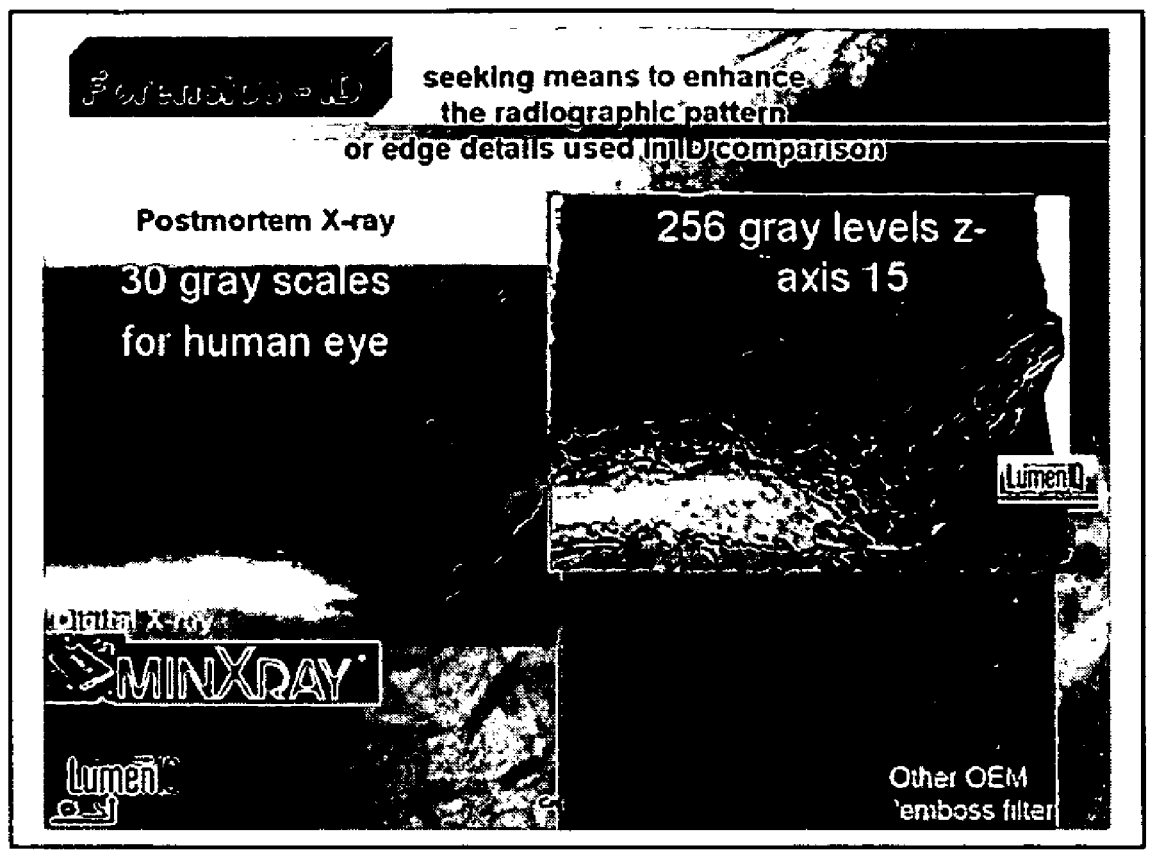
FIG. 28 shows point source lighting, combined with 3D topographical visualization, allows for enhanced discernment of clinically important, subtle anatomic detail, such as the anatomy of the trabecular bone in an X-ray of the angle of the lower jaw or small deviations in the outline of the jaw are better perceived (ZAK image). In contrast, standard 2D flat film or 2D film that is embossed provides less clarity.

LumenIQ Software Advantage:

Point source lighting, combined with 3D topographical visualization, allows for enhanced discernment of clinically important, subtle anatomic detail, such as the anatomy of the trabecular bone in an X-ray of the angle of the lower jaw or small deviations in the outline of the jaw are better perceived (ZAK image). In contrast, standard 2D flat film or 2D film that is embossed provides less clarity. See FIG. 28.

c. Limited Views in Standard Imaging Applications.

Standard dental imaging interfaces provide just one view of an image, which may not provide the clinician with the entire "picture" or perspective on which to render a judgment or outcome. The information may be there, but not perceived if is it depicted in a single standard 2D grayscale view.

LumenIQ Software Advantage

The ImageIQ interface offers a different and more comprehensive depiction. Specifically, when an image is captured and "processed" e.g., in a digital X-ray acquisition program, then at the same time the standard 2D grayscale X-ray appears on the monitor, different "views" based on previously agreed upon settings (preset filters) appear seamlessly adjacent to (tiled) along with it.

The ability to provide multiple snapshots (static or even with continuous cine motion loops) of an image in real time as opposed to "developing" them one a time or in different applications allows for greater throughput of cases, enhancing efficiency. This approach also enhances visual discrimination and may improve diagnostic capabilities.

Figure 29:
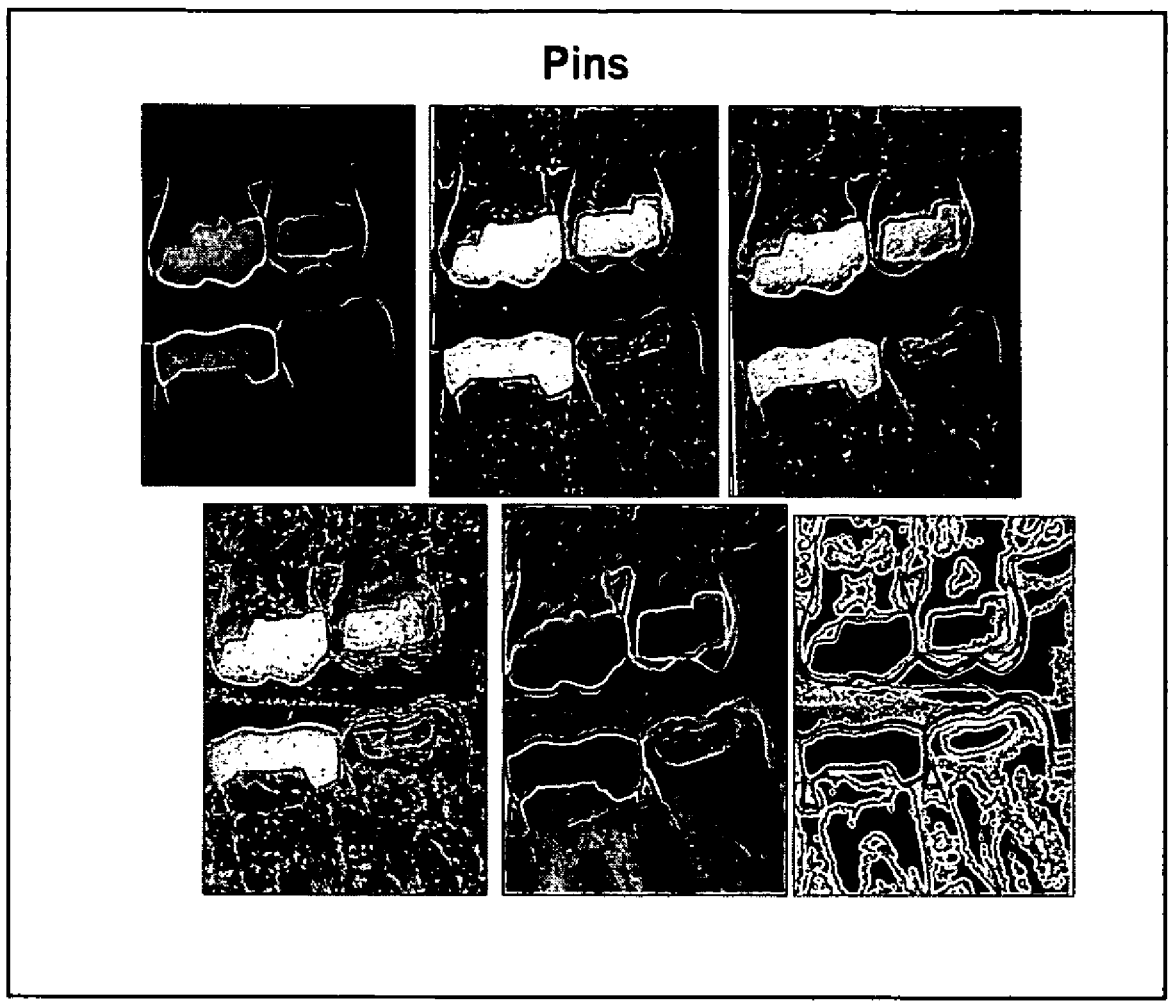
FIG. 29 shows the ability to provide multiple snapshots (static or even with continuous cine motion loops) of an image in real time as opposed to "developing" them one a time or in different applications allows for greater throughput of cases, enhancing efficiency. This approach also enhances visual discrimination and may improve diagnostic capabilities. The frames to the right demonstrate the advantage of multiple views, going from the $1^{st}$ image on the left (standard X-ray) followed by multiple presets (gray scales, contour lines, color etc). The clinician in this case would be trying to determine if the pin that was placed to support the amalgam restoration was in dentin, near or in the pulp. Multiple views and color mapping (pulp green, pin red) also facilitate greater clinician confidence in the outcome of the procedure.

The frames in FIG. 29 demonstrate the advantage of multiple views, going from the $1^{st}$ image on the left (standard X-ray) followed by multiple presets (gray scales, contour lines, color etc). The clinician in this case would be trying to determine if the pin that was placed to support the amalgam restoration was in dentin, near or in the pulp. Multiple views and color mapping (pulp green, pin red) also facilitate greater clinician confidence in the outcome of the procedure.

d. Inefficient interface between primary acquisition devices and image analysis programs.

Current X-ray acquisition applications and more robust image manipulation programs are independent of each other. Each is a stand alone and does not "communicate" with the others.

LumenIQ Software Advantage:

LumenIQ software can be integrated directly into image acquisition devices to allow for robust, real-time analysis of digital images at the time of capture.

e. Standard tools for examining a Region of Interest (ROI) are not optimized

Current dental imaging applications may use a "flashlight" tool, where the end user selects a sub-region within an image to be examined. Essentially, the user places the mouse over the ROI and automatically an "enhanced" view is seen on the monitor. However this is typically just a window leveling tool (brightness/contrast).

Figure 30:
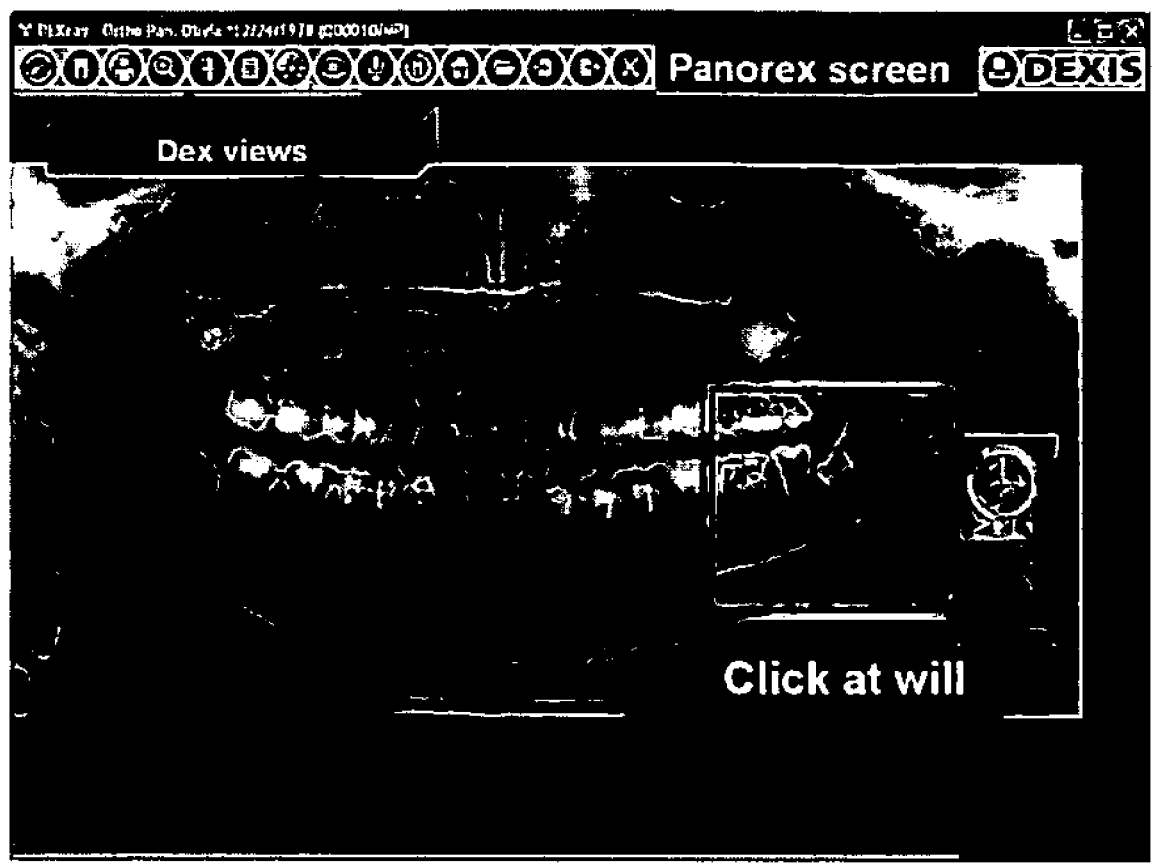
FIG. 30 shows that the ImageIQ software provides a clinically acceptable Region of Interest and/or moveable magnifying glass, so that only highlighted portions of the image are rendered with full 3D visualization in real-time, as the user moves the Region of Interest marker. The image shows an example of this tool: only the area contained in the region of interest has been visualized using ZAK images.

LumenIQ Software Advantage:

ImageIQ software provides a clinically acceptable Region of Interest and/or moveable magnifying glass, so that only highlighted portions of the image are rendered with full 3D visualization in real-time, as the user moves the Region of Interest marker. The image in FIG. 30 shows an example of this tool: only the area contained in the region of interest has been visualized using ZAK images.

4. Additional Embodiments and Configurations of Lumen Software in the Dental Imaging Systems.

The following paragraphs illustrate several embodiments for implementation and use of LumenIQ software in the dental imaging workflow. This list is not intended to be exhaustive:

i. Use with Existing Image Acquisition Devices: Existing LumenIQ patents and applications such as U.S. Pat. No. 6,445,820; U.S. Pat. No. 6,654,490; PCT/US01/26726; PCT/US02/22165, relate in part to use models involving ZAK images generated from user interaction with medical images and other images. Another use is to create ZAK images automatically on the image acquisition device. For example, projection radiography devices often generate image processed representations (for example, unsharp masked) from the fundamental acquired images and export these for interpretation. ZAK image representations are another image representation that can be exported and doing so offers the advantage that the image can be tailored to the signal characteristics of the particular imaging device to provide enhanced surface renderings and pixel-value-elevation mappings.

One desirable sequence on the image acquisition device is:

Acquire the image

Generate ZAK image(s) with enhanced elevation mapping, illumination and shading model(s).

Export the images for screen, print and/or soft-copy interpretation ii. IQ with Image-processed Images: The images herein include images that originate on an acquisition modality, as well as images derived from same, whether on the image acquisition modality (discussed above), or post-processed on another system, or dynamically on the interpretation system. The types of image processing include without limitation:

Images obtained from algebraic manipulation of images as in contrast subtraction, or other image operations such as tissue classification using, for example, neural networks on one or more acquired images.

Fused images

Segmented images iii. Derived Images—Data and Control Paths: In the processing step between the original images and the ZAK image generation step, the ZAK control can utilize information from the image processing step to define the initial presentation. Also, the user can manipulate the ZAK image. Optionally, feature detection software may provide data that optimizes the image processing and ZAK image formation. Examples include the selection of the image region and the display parameters of ZAK image generation. The ZAK image display can vary depending on characteristics of the image as determined by feature detection or image processing. The feature detection and image processing may exist on the same or separate systems or both.

iv. Control of intensity-elevation image display: User manipulation of a visualization tool such as IQ during interpretation may distract user attention from the image. Interspersing psychomotor tasks into the workflow can interfere with the clinical task, degrade productivity and performance, and fatigue the user. Mechanisms that minimize or eliminate user control operation are desirable. Mechanisms that generate ZAK images selectively, for example when they provide the enhanced value is also desirable.

Depending on context provided in images, worklist or preferences and scripts imported or configured on the system, or otherwise as desired, the interpretation system automatically creates ZAK images of with appropriate display parameters. The parameters may be a set that defines a dynamic image sequence for viewing. An example is varying the orientation of the intensity-elevation to rotate (e.g., wobble) the image relative to the user eye point.

The IQ display control may be an automatic invocation of a ZAK image tool that selects the source image(s), places the ZAK images on the protocol-allocated screen location (display layout), and displays the ZAK image with protocol specified parameters and display mode. Selection may be an automatic invocation or a system prompt to allow the user tot choose to continue without requiring the user to initiate selection through user interface mechanisms such as menus.

The IQ protocol configuration can specify the conditions that invoke the ZAK image. The condition expression may be logical operators and constants acting on inputs that may include:

The presence or value of any specified data elements in the image (the source image from which the ZAK image is invoked, such as the type of acquisition modality or the patient orientation).

The presence or value of any specified data elements in a worklist scheduled procedure step.

A presence of the image identifier appearing in another data instance such as derived image or a report (e.g., CAD report, Key Object Selection or other instance) that references the image.

Image content such as the average density of the pixels in the image or referenced region of interest.

Outputs from logical operations such as any of the above.

Also, ZAK image display layout and display parameters may depend on logical operations involving any of the data items listed above.

v. Intensity-elevation display of selected sub-volumes: The image interpretation system may generate ZAK images of sub-volumes selected by the user or algorithmically or otherwise as desired, with automated feature detection as shown in the exemplary figure below. The system creates one or more projection images of the selected volume, followed by the steps of ZAK image formation. The projections may be a set such as an orthogonal set, or other orientations. The user may interactively adjust the selected volume and alter the IQ display parameters.

As an example, a bone or tissue classification algorithm may locate the volume (or clinical range) occupied by a specific region of oral anatomy it detects such as floor of sinus, or foramen, or a detection of a suspected dental pathology. The tissue classification software may also use information stored with the image such as the orientation of the patient with respect to the set of images comprising the imaged volume.

The classification algorithm may also segment the anatomy of interest, masking out all but the desired tissue. In one embodiment, these views, and all other desired DCV views can be presented in a seamless motion animation of the changes over time. Interpolation of the contrast information between images can also be displayed in the animation.

From the foregoing, it will be appreciated that, although specific embodiments have been discussed herein for purposes of illustration, various modifications may be made without deviating from the spirit and scope of the discussion herein. Accordingly, the systems and methods, etc., include such modifications as well as all permutations and combinations of the subject matter set forth herein and are not limited except as by the appended claims.

What is claimed is:

1. A method for viewing a biological or medical image of tissue or an organ wherein the tissue or organ has been treated with a contrast agent comprising:
   a) providing an at least 2-dimensional high bit level digital image of the biological or medical image;
   b) subjecting the medical image to magnitude enhancement analysis such that at least one relative magnitude across at least a substantial portion of the image is depicted in an additional dimension relative to the at least 2-dimensions to provide a magnitude enhanced image such that additional levels of magnitudes are substantially more cognizable to a human eye compared to the 2-dimensional image without the magnitude enhancement analysis;
   c) displaying a selected portion of the enhanced medical image on a display comprising a display system wherein the display system has a bit level display capability less than the bit level of the digital medical image; and
   d) providing a moveable window configured to display a selected portion of the medical image such that the window can move the selected portion among an overall range of the bit level information in the high bit level image.

2. The method of claim 1 wherein the medical image is an image selected from the group consisting of a magnetic resonance image (MRI), a computational tomography (CT) scan image, a positron emission tomography (PET) scan image, an x-ray image, an electron microscopy (EM) image, a light microscopy (LM) and an ultrasound image.

3. The method of claims 1 or 2 wherein the contrast agent is selected from the group consisting of barium sulfate contrast agent, an iodinated contrast agent, an ionic contrast agent and an nonionic contrast agent.

4. The method of claim 3 wherein ionic contrast agent is selected from the group consisting of acetrizoic acid derivatives, diatrizoic acid derivatives, iothalamic acid derivatives, ioxithalamic acid derivatives, metrizoic acid derivatives, iodamide, lypophylic agents, aliphatic acid salts, iodipamide and ioglycamic acid.

5. The method of claim 3 wherein the nonionic contrast agent is selected from the group consisting of gadolinium, metrizamide, iopamidol, iohexol, iopromide, iobitridol, iomeprol, iopentol, ioversol, ioxilan and a nonionic dimeric contrast agent.

6. The method of claim 5 wherein the dimeric contrast agent is iodixanol or iotrolan.

7. The method of claim 1 wherein the magnitude is grayscale.

8. The method of claim 1 wherein the magnitude comprises at least one of hue, lightness, or saturation.

9. The method of claim 1 wherein the magnitude comprises a combination of values derived from at least two of grayscale, hue, lightness, or saturation.

10. The method of claim 1 wherein the magnitude comprises an average intensity defined by an area operator centered on a pixel within the image.

11. The method of claim 1 wherein the magnitude enhancement analysis is a dynamic magnitude enhancement analysis.

12. The method of claim 11 wherein the dynamic analysis comprises incorporating the dynamic analysis into a cine loop.

13. The method of claim 11 or 12 wherein the dynamic analysis comprises at least rolling, tilting or panning the image.

14. A networked computer system comprising computer-implemented programming that performs the automated elements of the method of claim 1.

15. The networked computer system of claim 14 wherein the networked computer system comprises a handheld wireless computer, and the method of claim 1 is implemented on the handheld wireless computer.

16. A method of determining and visualizing a change in a tissue or organ comprising:
   a) providing a first at least 2-dimensional digital image of tissue or organ of an individual at an initial time;
   b) providing additional digital images of substantially the same tissue or organ at later periods of time;
   c) subjecting the images to magnitude enhancement analysis such that at least one relative magnitude across at least a substantial portion of each image is depicted in an additional dimension relative to the at least 2-dimensions to provide magnitude enhanced images such that additional levels of magnitudes are substantially more cognizable to a human eye compared to the 2-dimensional image without the magnitude enhancement analysis;
   d) comparing the magnitude enhanced images to each other to indicate changes in at least on biological, chemical or physical property of the tissue or organ over time.

17. The method of claim 16 wherein the medical images are an image selected from the group consisting of MRI images, CT scan images, PET scan images, x-ray images, EM, LM and ultrasound images.

18. The method of claim 17 wherein the first medical image of the tissue or organ is taken prior to treating the tissue or organ with a contrast agent and subsequent images are taken after treating the tissue or organ with a contrasting agent.

19. The method of claim 18 wherein the contrast agent is selected from the group consisting of barium sulfate contrast agent, an iodinated contrast agent, an ionic contrast agent and an nonionic contrast agent.

20. The method of claim 19 wherein ionic contrast agent is selected from the group consisting of acetrizoic acid derivatives, diatrizoic acid derivatives, iothalamic acid derivatives, ioxithalamic acid derivatives, metrizoic acid derivatives, iodamide, lypophylic agents, aliphatic acid salts, iodipamide and ioglycamic acid.

21. The method of claim 19 wherein the nonionic contrast agent is selected from the group consisting of gadolinium, metrizamide, iopamidol, iohexol, iopromide, iobitridol, iomeprol, iopentol, ioversol, ioxilan and a nonionic dimeric contrast agent.

22. The method of claim 21 wherein the dimeric contrast agent is iodixanol or iotrolan.

23. The method of claim 16 wherein the magnitude is grayscale.

24. The method of claim 16 wherein the magnitude comprises at least one of hue, lightness, or saturation.

25. The method of claim 16 wherein the magnitude comprises a combination of values derived from at least two of grayscale, hue, lightness, or saturation.

26. The method of claim 16 wherein the magnitude comprises an average intensity defined by an area operator centered on a pixel within the image.

27. The method of claim 16 wherein the magnitude enhancement analysis is a dynamic magnitude enhancement analysis.

28. The method of claim 27 wherein the dynamic analysis comprises incorporating the dynamic analysis into a cine loop.

29. The method of claim 27 or 28 wherein the dynamic analysis comprises at least rolling, tilting and panning the image.

30. A method of analyzing a tissue or organ wherein the tissue or organ has been treated with a contrast agent comprising:
   a) providing an at least 2-dimensional digital image of the tissue or organ comprising a plurality of color space dimensions;
   b) subjecting the 2-dimensional digital image to magnitude enhancement analysis such that a relative magnitude for at least one color space dimension but less than all color space dimensions of the image is depicted in an additional dimension relative to the at least 2-dimensions to provide a magnitude enhanced image such that additional levels of magnitudes of the color space dimension are substantially more cognizable to a human eye compared to the 2-dimensional image without the magnitude enhancement analysis;
   c) displaying at least a selected portion of the magnitude enhanced image on a display;
   d) analyzing the magnitude enhanced image to determine at least one feature of the color space dimension that would not have been cognizable to a human eye without the magnitude enhancement analysis.

31. The method of claim 30 wherein the method further comprises determining an optical density of at least one object in the image.

32. The method of claim 30 or 31 wherein the object is breast tissue.

33. The method of claim 30 or 31 wherein the magnitude enhancement analysis is a dynamic magnitude enhancement analysis.

34. The method of claim 33 wherein the dynamic analysis comprises incorporating the dynamic analysis into a cine loop.

35. The method of claim 33 wherein the dynamic analysis comprises at least rolling, tilting and panning the image.

36. The method of claim 30 wherein the contrast agent is selected from the group consisting of barium sulfate contrast agent, an iodinated contrast agent, an ionic contrast agent and an nonionic contrast agent.

37. The method of claim 36 wherein ionic contrast agent is selected from the group consisting of acetrizoic acid derivatives, diatrizoic acid derivatives, iothalamic acid derivatives, ioxithalamic acid derivatives, metrizoic acid derivatives, iodamide, lypophylic agents, aliphatic acid salts, iodipamide and ioglycamic acid.

38. The method of claim 36 wherein the nonionic contrast agent is selected from the group consisting of gadolinium, metrizamide, iopamidol, iohexol, iopromide, iobitridol, iomeprol, iopentol, ioversol, ioxilan and a nonionic dimeric contrast agent.

39. The method of claim 38 wherein the dimeric contrast agent is iodixanol or iotrolan.

40. A computer comprising computer-implemented programming that performs the automated elements of the method of any one of claims 1 16 or 30.

41. The computer of claim 40 wherein the computer comprises a distributed network of linked computers.

42. The computer of claim 41 wherein the computer comprises a handheld computer, and the method of claim 1 is implemented on the handheld computer.

43. The computer of claim 42 wherein the computer comprises a wirelessly connected computer, and the method of claim 1 is implemented on the wireless computer.

44. A networked computer system comprising a computer according to claim 40.

* * * * *